(12) United States Patent
Xue et al.

(10) Patent No.: US 6,584,979 B2
(45) Date of Patent: Jul. 1, 2003

(54) HIGH EFFICIENCY CIGARETTE FILTERS HAVING SHAPED MICROCAVITY FIBERS IMPREGNATED WITH ADSORBENT OR ABSORBENT MATERIALS

(75) Inventors: Lixin Luke Xue, Midlothian, VA (US); Kent B. Koller, Chesterfield, VA (US); Qiong Gao, Great Neck, NY (US)

(73) Assignee: Philip Morris Incorporated, New York, NY (US)

( * ) Notice: Subject to any disclaimer, the term of this patent is extended or adjusted under 35 U.S.C. 154(b) by 0 days.

(21) Appl. No.: 09/839,669

(22) Filed: Apr. 20, 2001

(65) Prior Publication Data

US 2002/0020420 A1 Feb. 21, 2002

Related U.S. Application Data

(60) Provisional application No. 60/198,628, filed on Apr. 20, 2000.

(51) Int. Cl.$^7$ ................................................ A24D 3/06
(52) U.S. Cl. .................. 131/344; 131/342; 131/361; 131/202; 131/332; 131/331
(58) Field of Search ................... 131/342, 331, 131/365, 202, 203, 332, 335, 361, 345, 84.1, 344, 360; 493/39, 47, 50

(56) References Cited

U.S. PATENT DOCUMENTS

| | | | |
|---|---|---|---|
| 3,011,981 A | 12/1961 | Soltes | 252/502 |
| 3,116,739 A | 1/1964 | Andonie | 131/10 |
| 3,595,137 A | 7/1971 | Molins et al. | 93/1 C |
| 3,756,253 A | * 9/1973 | Honda et al. | 131/267 |
| 3,904,577 A | 9/1975 | Buisson | 260/37 |
| 4,074,724 A | 2/1978 | Morie et al. | 131/267 |
| 4,188,960 A | 2/1980 | Morie et al. | 131/267 |
| 4,195,649 A | 4/1980 | Noguchi et al. | 131/261 |
| 4,260,523 A | 4/1981 | Tsukamoto | 252/447 |
| 4,280,925 A | 7/1981 | Kiefer | 252/428 |
| 4,468,845 A | 9/1984 | Harris | 28/283 |
| 4,505,282 A | 3/1985 | Cogbill et al. | 131/334 |
| 4,612,333 A | 9/1986 | Vassileff | 521/83 |
| 4,619,948 A | 10/1986 | Kennedy et al. | 521/52 |
| 4,729,391 A | * 3/1988 | Woods et al. | 131/332 |
| 4,736,755 A | 4/1988 | Oldham et al. | 131/270 |
| 4,858,629 A | 8/1989 | Cundari | 131/332 |
| 4,917,660 A | 4/1990 | Spaller, Jr. et al. | 493/42 |
| 4,961,415 A | 10/1990 | Radwanski et al. | 131/332 |
| 4,964,426 A | 10/1990 | Lee et al. | 131/342 |
| 5,057,368 A | 10/1991 | Largman et al. | 428/397 |
| 5,141,006 A | 8/1992 | Lee et al. | 131/331 |
| 5,150,723 A | 9/1992 | Lee et al. | 131/342 |
| 5,162,074 A | 11/1992 | Hills | 156/644 |
| 5,178,166 A | 1/1993 | Newsome et al. | 131/336 |
| 5,191,905 A | 3/1993 | Tsukamoto | 131/332 |
| 5,244,614 A | 9/1993 | Hagan | 264/78 |
| 5,262,110 A | 11/1993 | Spaller, Jr. et al. | 264/207 |
| 5,269,996 A | 12/1993 | Lee et al. | 264/207 |
| 5,271,419 A | 12/1993 | Arzonico et al. | 131/365 |
| 5,275,859 A | 1/1994 | Phillips et al. | 428/65 |
| 5,307,823 A | 5/1994 | Jones et al. | 131/331 |
| 5,356,704 A | 10/1994 | Phillips et al. | 428/297 |
| 5,360,023 A | 11/1994 | Blakley et al. | 131/331 |
| 5,365,951 A | 11/1994 | Arterbery et al. | 131/339 |

(List continued on next page.)

Primary Examiner—Steven P. Griffin
Assistant Examiner—Dionne A. Walls
(74) Attorney, Agent, or Firm—Connolly Bove Lodge & Hutz LLP

(57) ABSTRACT

This invention is a highly efficient filter containing fibers that contain small particle size adsorbents/absorbents such as carbon and/or silica to selectively reduce targeted components in mainstream cigarette smoke. The invention relates to a novel class of highly efficient cigarette smoke filters made from much smaller solid fine particles (preferably 1–50 micrometers in diameter) impregnated in shaped fibers that possess open or semi-opened microcavity. The invention further relates to a cigarette having a plug/space/plug or plug/space configuration and having the impregnated filters resided in the space in bonded non-woven or freely unbounded manner to allow controlled TPM delivery.

28 Claims, 11 Drawing Sheets

U.S. PATENT DOCUMENTS

| | | | |
|---|---|---|---|
| 5,404,890 A | 4/1995 | Gentry et al. | 131/342 |
| 5,423,128 A | 6/1995 | Moore, Jr. et al. | 33/488 |
| 5,505,888 A | 4/1996 | Mitchell et al. | 264/138 |
| 5,509,430 A | 4/1996 | Berger | 131/341 |
| 5,512,230 A | 4/1996 | Cannon, III | 264/169 |
| 5,568,819 A * | 10/1996 | Gentry et al. | 131/342 |
| 5,599,858 A | 2/1997 | Buchanan et al. | 524/41 |
| 5,633,082 A | 5/1997 | Berger | 428/365 |
| 5,662,773 A | 9/1997 | Frederick et al. | 162/4 |
| 5,704,966 A | 1/1998 | Rohrbach et al. | 95/170 |
| 5,713,971 A | 2/1998 | Rohrbach et al. | 55/233 |
| 5,744,236 A | 4/1998 | Rohrbach et al. | 428/372 |
| 5,779,736 A | 7/1998 | Frederick et al. | 8/130 |
| 5,902,384 A | 5/1999 | Rohrbach et al. | 96/296 |
| 5,911,224 A | 6/1999 | Berger | 131/332 |
| 5,922,451 A | 7/1999 | Cox et al. | 428/323 |
| 5,947,126 A | 9/1999 | Wilson et al. | 131/331 |
| 5,951,744 A | 9/1999 | Rohrbach et al. | 96/154 |
| 5,970,988 A | 10/1999 | Buchanan et al. | 131/332 |
| 6,133,439 A | 10/2000 | Buchanan et al. | 536/32 |
| 6,209,547 B1 | 4/2001 | Koller et al. | 131/331 |
| 6,387,831 B2 * | 5/2002 | Rhim et al. | 442/414 |

* cited by examiner

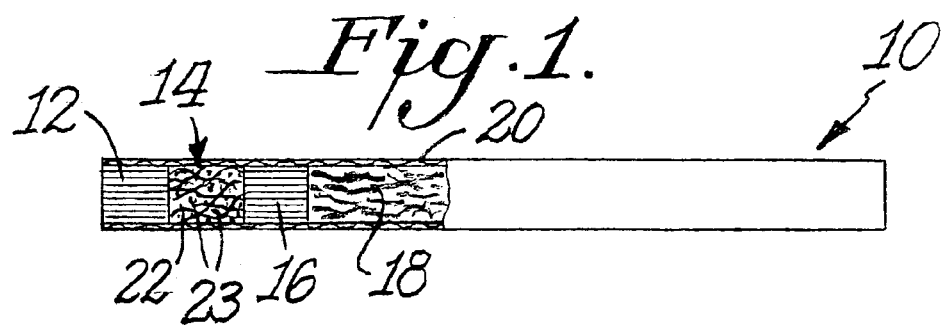
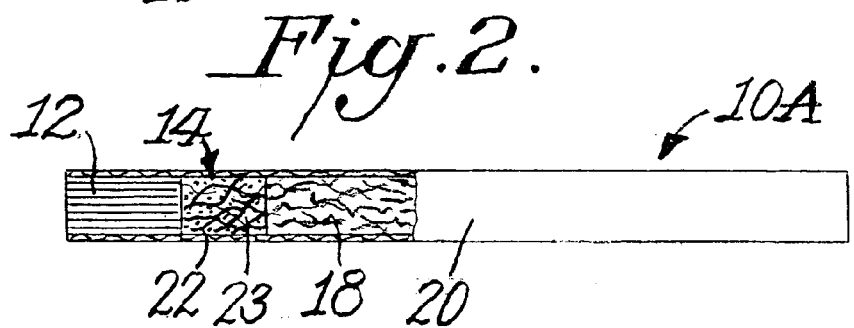
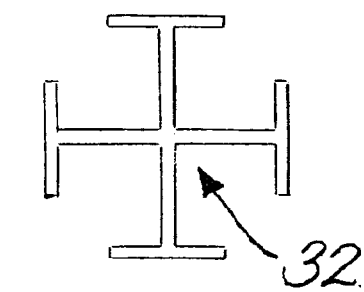
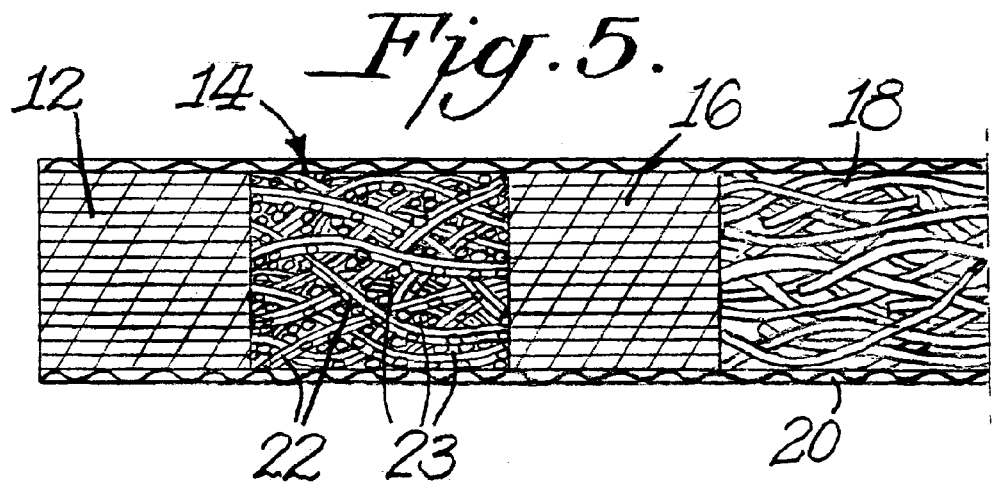

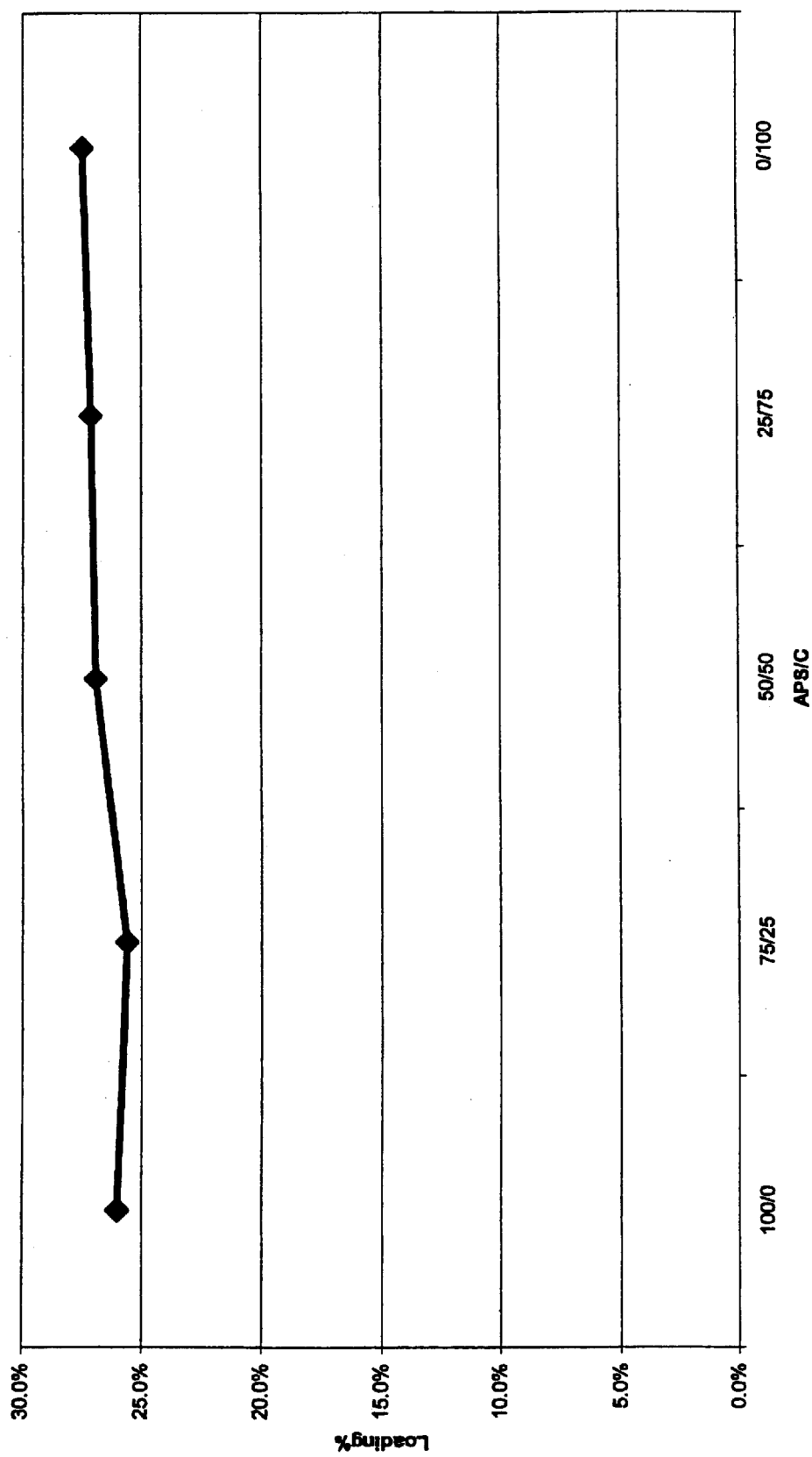

HIGH EFFICIENCY CIGARETTE FILTERS HAVING SHAPED MICROCAVITY FIBERS IMPREGNATED WITH ADSORBENT OR ABSORBENT MATERIALS

RELATED APPLICATIONS

This application claims benefit to provisional application No. 60/198,628 filed in Apr. 20, 2000, which is incorporated by reference in its entirety for all useful purposes.

TECHNICAL FIELD

This invention is intended to selectively reduce certain components in mainstream cigarette smoke through the use of an efficient filter incorporating smaller particle size adsorbents and/or absorbents than those typically used for cigarette filter manufacture. The invention relates to a novel class of cigarette smoke filters containing solid fine particles (about 1 to about 50 micrometers in diameter) of adsorbents/absorbents loaded in the micro cavities of fibers with shaped cross sections. The invention further relates to a cigarette having multi-component filter configurations and a cigarette filter using the fibers just described.

BACKGROUND OF THE INVENTION

A wide variety of fibrous materials have been employed in tobacco smoke filter elements. Cellulose Acetate ("CA") has long been considered the material of choice for this application. However, the choice of materials has been limited because of the need to balance various commercial requirements. A very important property is the filtration efficiency i.e. the ability to selectively remove or reduce undesired components from mainstream cigarette smoke stream.

To achieve appropriate filtration efficiency, materials such as carbon have been incorporated into cigarette filters. A current method for incorporating adsorbent materials in cigarette filters is the physical entrapment of adsorbent particles between CA fibers. The particle size of materials used in such prior art is generally limited in the range of 500 to about 1500 microns in diameter. In order to achieve reasonable product integrity and pressure drop, smaller particles could not be used in this design. In addition, the adsorbents were found to lose activity from exposure to triacetin, a plasticizer used as a binder for the CA fibers.

An improved and more expensive design is to put certain materials in the cavity between CA plugs in a Plug/Space/Plug (P/S/P) filter configuration to limit the exposure of adsorbent to the binder. In order to keep the pressure drop through the filter within acceptable limits, coarse granulated materials in the size of about 10 to about 60 mesh are generally used. A longer shelf life of the adsorbent was achieved, but the efficiency of the filters was limited by the relatively large particle size used. Finer size adsorbent particles with shorter internal diffusive paths and higher effective surface areas cannot be used directly in this configuration due to excessive pressure drop.

Smaller particle size adsorbent/absorbent materials generally have enhanced kinetics of reaction with gas phase components because of their shorter diffusion paths to the interior surface area of such porous materials and the interior body of such absorbent materials. It was known that employing smaller absorbent particles with shorter diffusion paths can form filters with improved kinetics and capacity for gas phase filtration applications.

It has been found that a fiber with open or semi-open micro cavities is desirable for holding the adsorbent/absorbent material in place. The term "semi-open cavities" as used herein means cavities that possess openings smaller in dimension than the internal volume of the fiber in which they are formed, and that possess the ability to entrap solid fine particles in their internal volume. The term "open cavities" means the opening is the same or bigger in dimension than the internal volume of the fiber in which they are formed.

U.S. Pat. No. 5,509,430 which is incorporated by reference in its entirety for all useful purposes including all drawings relates to polymeric bicomponent fibers and to the production of tobacco smoke filters from bicomponent fibers comprising a core of a low cost, high strength, thermoplastic polymer and a bondable sheath of a material. There is a need to develop an improved filter that has better efficiency in selectively removing or reducing undesired components from mainstream cigarette smoke stream.

U.S. Pat. No. 5,191,905 issued to Tsukamoto, which is incorporated by reference in its entirety for all useful purposes including all the drawings describes a cigarette filter. The cigarette filter has a filter chip integrally joined to the cigarette section. The filter chip is formed by combining in a bundle, at least one absorptive synthetic fiber selected from the group consisting of (1) graft polymer fibers produced from irradiated polypropylene reacted with vapor phase styrene and containing adsorptive functional groups, (2) activated carbon fibers, (3) charged electret fibers and (4) magnetic plastic fibers and then chopping the combined fibers to a predetermined length. However, Tsukamoto does not teach that the fibers (1) have micro-cavities and (2) that the carbon is loaded in the micro-cavities.

U.S. Pat. No. 5,057,368 ("'368 patent"), which is incorporated by reference in its entirety for all useful purposes including all the drawings describes shaped micro-cavity fibers that are multilobal such as trilobal or quadrilobal. Other U.S. patents which disclose fibers which are incorporated by reference in its entireties including the drawings are: U.S. Pat. Nos. 5,902,384; 5,744,236; 5,704,966 and 5,713,971. In addition, U.S. Pat. Nos. 5,244,614 and 4,858, 629 also disclose multilobal fibers and are incorporated by reference in its entirety for all useful purposes. However, there is no disclosure in these patents that these fibers can be used in cigarette filters. U.S. Pat. Nos. 5,356,704 and 5,275, 859; are all assigned on the face of the Patents to Eastman Chemical Company ("Eastman") and these patents disclose smoke filters. All these patents are incorporated by reference in their entirety for all useful purposes.

The terms "adsorbent" or "absorbent" as used herein are defined to mean that the ability of a material to take in or soak up gas components on the surface thereof or to assimilate such components into the body thereof.

SUMMARY OF THE INVENTION

An object of this invention is to provide highly efficient filters to selectively reduce certain gas phase smoke constituents such as aldehydes, dienes, benzene, toluene, and hydrogen cyanide with minimal interaction with the particulate phase delivery and while maintaining a desirable pressure drop.

The invention further relates to a filter used in cigarettes which comprises fibers that have open or semi-opened micro-cavities impregnated with a variety of small particles of adsorbent and/or absorbent materials.

BRIEF DESCRIPTION OF THE FIGURES

A better understanding of the present invention, as well as other objects, features and advantages thereof will become apparent upon consideration of the detailed description herein, in connection with the accompanying drawings.

FIG. 1 is a cross-sectional side elevational view showing a plug space plug (P/S/P) filter attached to a cigarette that serves as an example of one of the cigarette filter designs according to the invention;

FIG. 2 is a cross-sectional side elevational view showing a plug space (P/S) filter attached to a cigarette that serves as an example of one of the cigarette filter designs according to the invention;

FIG. 3 is an enlarged elevational view of a trilobal fiber that serves as an example of fibers possessing semi-open micro cavities that can be used in the invention;

FIG. 4 is an enlarged elevational view of a quadrilobal fiber that serves as an example of fibers possessing semi-open micro cavities that can be used for the invention;

FIG. 5 is an enlarged view of FIG. 1 according to the invention;

FIG. 16 illustrates a Puff-by-Puff comparison on PP 4DG filter performance on MeOH Delivery and FIG. 17 illustrates the effect of particle composition on loading factor in the PP-4DG fiber.

DETAILED DESCRIPTION OF THE INVENTION

Turning to FIGS. 1 and 2, there are illustrated two examples of high efficiency cigarette filters according to the present invention. It will be readily understood that the scope of this invention is not limited to these two configurations of filter designs. Rather, the scope of the present invention includes alternative cigarette configurations that incorporate the adsorbent/absorbent impregnated fibers described herein in any part of the cigarette that can interact with the smoke stream.

Figure 10:
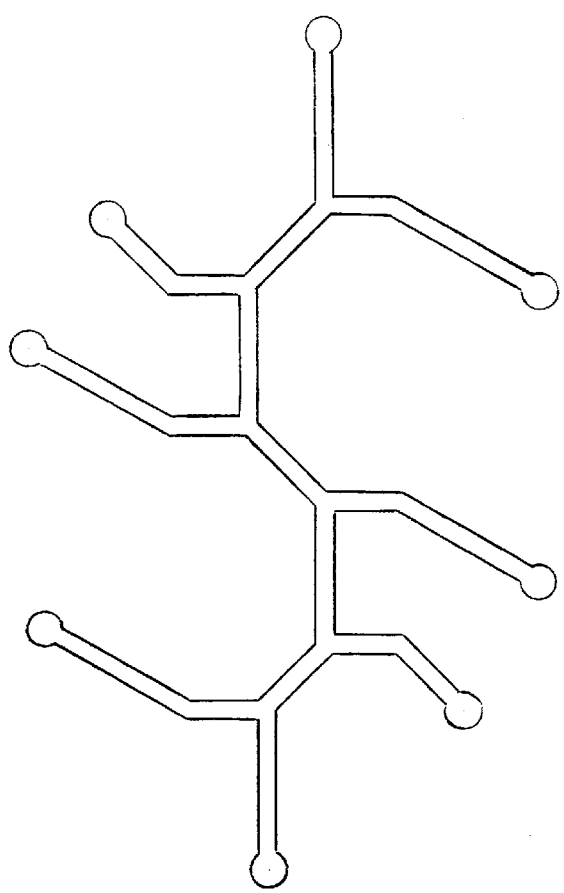
FIG. 10 illustrates a fiber that has open cavities according to the invention.

FIG. 1 is a cross-sectional side elevational view showing a plug/space/plug (P/S/P) filter attached to a cigarette 10. The cigarette 10 has a downstream plug 12, a space 14 and an upstream plug 16 configuration with the downstream plug 12, space 14 and upstream plug 16 all being connected. Desirably, the downstream plug 12 is made of CA or any other material suitable for this position in a cigarette filter. The upstream plug 16 can be the same or different from the downstream plug 12. A tobacco rod 18 is connected to the upstream plug 16 using a tipping paper as is well known in the art. A quantity of a micro-cavity fiber 22 impregnated with an adsorbenVadsorbent material 23 is inserted in the space 14. In this non-limiting example, the fibers 22 contain open or semi-open micro cavities that include, but are not limited to, multilobal shaped fibers as described in the '368 patent and U.S. Pat. No. 5,509,430. Two examples of suitable fibers 22 are illustrated in FIGS. 3 and 4. A non-limiting example of such a fiber is Honeywell's TRIAD™ fiber having an internal void fractional volume from about 0.5 to about 0.6. These fibers are capable of mechanically or electrostatically entrapping fine particles inside the fiber micro-cavity channels. Multilobal shaped fibers containing end caps would be considered fibers with semi-open cavities (see FIGS. 3 and 4). Multilobal fibers without the end caps could be considered fibers with open cavities (see FIGS. 8, 9 and 10). The fibers may be constructed from any material suitable for cigarette use. In a preferred embodiment, the fibers are constructed from polypropylene ("pp"). Other micro-cavity fibers having the same performance characteristics may be used in the practice of the present invention. An example of other fibers is the ones described above, for example, Eastman Chemical Company's fibers.

Suitable fine adsorbent/absorbent particles 23 for use in this invention include particles that have the ability to react with or retain selected components from cigarette mainstream smoke. Such adsorbent materials include, but are not limited to, carbons, aluminas, silicates, molecular sieves, zeolites, and metal particles. The carbon powders used can be, but are not limited to, wood based, coal based or coconut shell based or derived from any other carbonaceous materiel. Optionally, the solid powder may be treated with desired chemical reagents, so as to modify the particle surfaces to include a particular functional group or functional structure.

Coconut shell carbon powder available from Pica and a powdered Amino Propyl Silyl (APS) Silica Gel are examples of the particles 23 used for preparing the impregnated fibers according to the invention. One way to prepare the impregnated fibers is by using an excess amount of the adsorbent/absorbent particles 23. The absorbant particles 23 are first mechanically mixed with the fiber 22 in a closed volume. The excess of particles 23 are removed by any conventional means, such as, but not limited to, blowing with an air stream or separation with a sieve, such as a #70 mesh sieve. The resulting impregnated fibers will thus have a Loading Factor (LF) which term is defined as the ratio of the weight of material in the fiber micro cavities divided by the weight of the fiber itself. The Loading Factor may be expressed as a percentage or as a decimal number. In the practice of the present invention, the Loading Factor may vary widely, having a value of more or less than 1.0 (when expressed as a decimal number) depending on the adsorbent/absorbent materials used.

The Loading Factor may vary between about 1% and about 150%. More desirably, the Loading Factor is between about 20% and about 80%. More preferably, for Pica coconut carbon powder, the Loading Factor is about 50%.

The carbon particle size is preferably from about 1 micron to about 50 microns. The particles 23 are held in the open or semi-opened micro cavities of shaped fibers 22 via mechanical or electrostatic interaction, thereby avoiding exposure to binders or plasticizers used in cigarette filter fabrication processes. There is no need to use binders or plasticizers to get the particles to adhere to the fiber. In the examples, the fibers 22 that are impregnated with the particles 23 are then inserted in the space 14 of a cigarette with a plug/space/plug filter configuration, and packed to a density to achieve the desired result, to filter out the selected smoke gas phase components, such as aldehydes, dienes, benzene, toluene, and hydrogen cyanide. A wrapper 20 encases the tobacco rod 18, upstream plug 16, the space 14, the impregnated fiber 22, and the downstream plug 12.

FIG. 2 illustrates an alternative cigarette filter embodiment of the present invention having a plug/space configuration. The cigarette 10A has a downstream plug 12 and a space 14. The fiber 22 impregnated with the adsorbent/absorbent 23 is inserted in the space 14.

The practice of the present invention includes the use of other multi-component filter configurations. The fiber 22 impregnated with the adsorbent 23 acts as a filter component and can be placed at any location in the cigarette that is exposed to the smoke stream, such as at the plug locations 12 and 16.

FIGS. 3 and 4 illustrate two examples of semi-open micro-cavity fibers that are useful in the practice of the present invention, as described in the '368 patent.

FIG. 5 is an enlargement of FIG. 1 and illustrates the multilobal fibers 22 with semi-open micro-cavities being impregnated with fine adsorbent/absorbent particles 23 in a P/SIP configuration.

Figure 6:
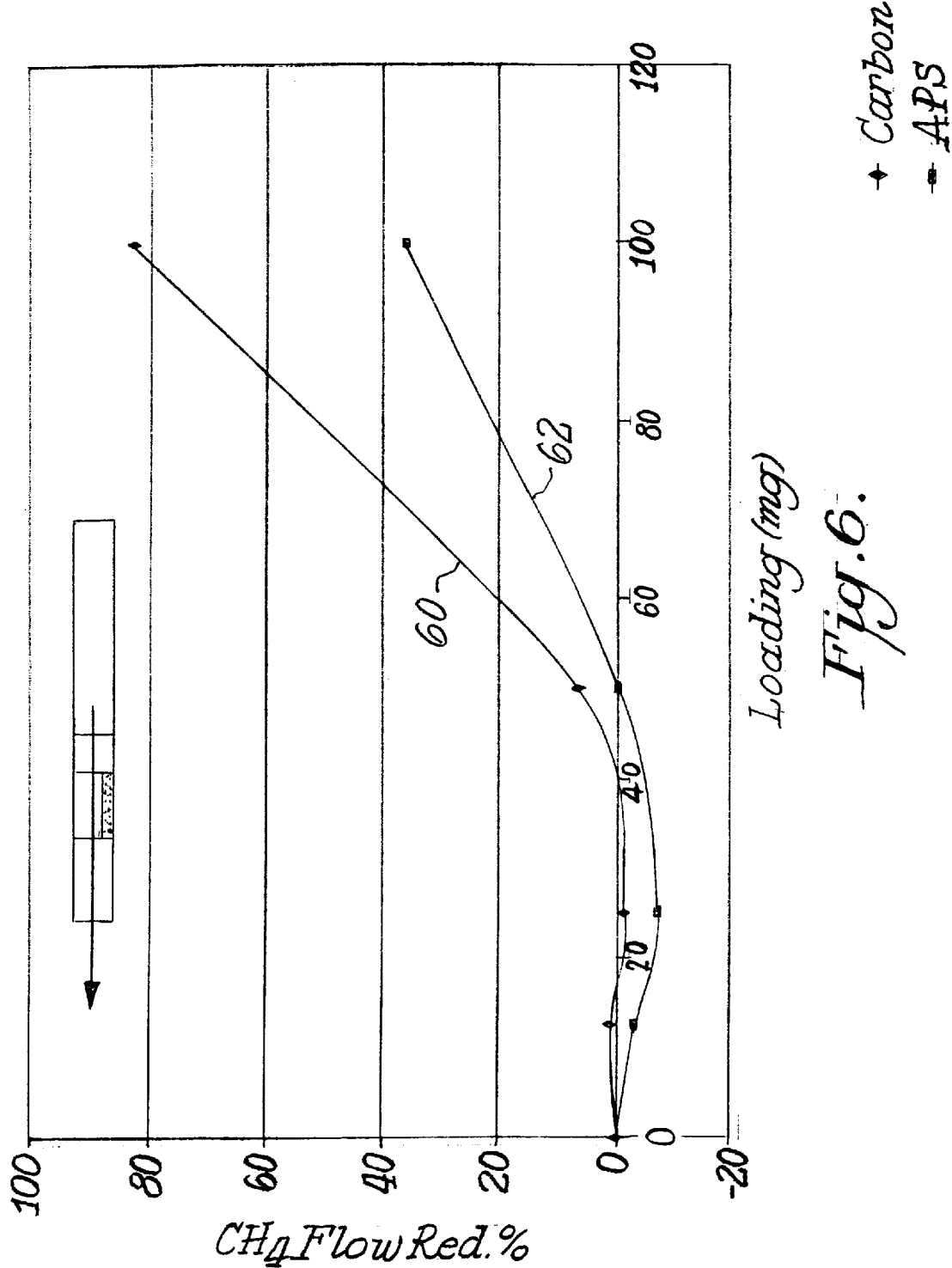
FIG. 6 is a graph showing the filter performance of closely packed solid powders in the plug/space/plug cigarette filters without being retained by the micro-cavity fibers.

FIG. 6 is a graph showing the obstruction-to-flow (also described as "resistance to draw" (RTD)) filter performance of a P/S/P filter cigarette constructed using prior art powder loading techniques. Cigarettes were constructed using both carbon powder, curve 60 and APS silica gel, curve 62. The graph illustrates obstruction-to-flow filtration performance in terms of percentage of methane ($CH_4$) reduction versus filter loading in milligrams. Methane does not interact with the filtration materials and is used as an indicator or "internal standard" for overall delivery of gas-phase smoke and as a baseline for selective filtration performance of gas-phase smoke constituents. This is similar in concept to using Total-Particulate-Matter ("TPM") as an indicator for overall delivery of particulate-phase smoke. That is, a P/S/P cigarette was prepared having a completely empty space between the plugs. The methane delivery of that cigarette was compared to that of a cigarette having a quantity of loose adsorbent/absorbent powder placed in the space between the plugs. The latter cigarette generally showed some reduction in methane delivery compared to the former cigarette. However, as will be explained below, at very low levels of added adsorbent/absorbent powder, the latter cigarette actually shows no methane reduction.

The higher the reduction of the methane mainstream smoke component, the more RTD is observed indicating overall smoke reduction rather than selective filtration of certain smoke components.

To arrive at the data shown in FIG. 6, a number 2280 experimental cigarette with a P/S/P filter design was used. The following nomenclature is used in the data tables to describe the alternate filter designs. The designation "P1" refers to a downstream plug and the designation "P2" refers to an upstream plug. Between these two plugs P1, P2 is a space "S" that was filled with some type of material. The following designations are used for the various impregnated and non-impregnated fiber materials used in the space:

| Designation | Description |
|---|---|
| F | Non-impregnated Micro-cavity fiber |
| F(C) | Carbon-impregnated Micro-cavity fiber |
| F(APS) | APS-impregnated Micro-cavity fiber |

Thus, a designation "P1/F(C)/P2" refers to a P/S/P filter configuration wherein the space between plugs is filled with a micro cavity fiber that is carbon impregnated. A designation "P1/F(C)" refers to a Plug/Space filter configuration wherein a plug is positioned adjacent a space containing carbon-impregnated micro cavity fiber.

To create the data illustrated in FIG. 6, the P1 and P2 plugs had a diameter of 7.5 mm and lengths of 14.5 mm and 8 mm respectively. The weights of P1 and P2 plugs were around 77 and 45 mg, respectively. The powders were loaded in the cylindrical space between these two plugs which have a dimension of about 7.5 mm OD×4.5 mm in length. The cigarettes were smoked under FTC conditions, and an in-house developed IR detection system was used to measure its methane delivery. The carbon used for the experiments was Pica coconut-based sample #99-2-3 with a median particle diameter of about 10 micrometers and the APS silica gel used was a ground silica gel with specific surface treatment with median particle diameter of about 5 micrometers. The surface area of the APS silica gel was about 300 $m^2/g$ and the surface area of the activated carbon was about 2000 $m^2/g$.

From the results shown in FIG. 6, it can be seen that when the loading of the particles is 40 mg or less, the smoke stream passed through the space between the plugs without sufficient interaction between the absorbent/adsorbent materials and the mainstream smoke. In order to achieve better interaction, more powder was loaded into the space. Both the Pica carbon dust and the ground samples of APS silica gel showed methane reduction when their loading levels were more than 50 mg. Again, in these experiments, the powdered adsorbents/absorbents lay in the bottom of the space between plugs such that a void was created above the powder. Such a void would allow mainstream smoke to pass by with a resulting less-than-desired filtration efficiency.

The results of another round of experiments conducted with only 25 mg of powder between the plugs is illustrated in Table 1. In the examples, any void in the space above the solid fine powder was eliminated after the two plugs P1 and P2 were pushed together within the filter structure so as to compress the powder between the plugs. In example 3, an additional section of CA plug material was added to the filter structure after the plugs were compressed against the powder. Relatively high levels of methane reduction was observed for both cases. While small particle size is desired for the enhanced filtration kinetics, small particles tend to pack tightly and block the mainstream smoke flow.

TABLE I

| Example | Filter Type | X is Carbon | X is APS |
|---|---|---|---|
| 1 | P1/S(X)/P2 without fiber | −1% | −7% |
| 2 | S/P1/x/P2 | 94% | 24% |
| 3 | P/P1/x/P2 | 94% | 31% |
| 4 | P2/F(x) | 3% | −1% |
| 5 | P2/F(X)* | −3% | −1% |

To address the above-described problems associated with using small particles in cigarette filters, the present invention comprehends using fibers having open or semi-open micro-cavities to retain such small particles of adsorbents/absorbents. Fine particles of absorbents/adsorbents are first impregnated in the micro-cavities of the fibers, and the impregnated fibers are then incorporated into cigarette filters in some manner. The small particles can be uniformly distributed in the cigarette filter to interact with the smoke stream without causing the observed obstruction to flow that results from closely packed small particles. As shown by the results in Table 2, 25 mg of solid powders such as carbon or APS silica gel loaded in about 100 mg of semi-open micro-cavity fibers of P/F(x) configuration gave much higher acetaldehyde and hydrogen cyanide filtration than the P/S(x)/P configuration without such loaded micro-cavity fibers, while no obvious methane reduction occurred in these examples as shown in Table 1.

TABLE 2

| Exp | Filter Type | Powder (mg) | Triad (mg) | AA | HCN |
| --- | --- | --- | --- | --- | --- |
| 6 | P1/S(c)/P2 | 25 | 0 | −19% | −36% |
| 7 | P2/F(c) | 25 | 106 | −29% | −69% |
| 8 | P1/S(APS)/P2 | 25 | 0 | −15% | −26% |
| 9 | P2/F(APS) | 25 | 96 | −36% | −75% |

In Table 2 the follow abbreviations are used:
AA Acetaldehyde
HCN Hydrogen Cyanide The impregnated micro-cavity fibers can selectively target various mainstream smoke components through the choice of the absorbent/absorbent materials used. One of the preferred examples of these materials is carbon powder, which can target a broad range of cigarette smoke components as illustrated in Table 3 below.

TABLE 3

| Sample | Comparative example 10 | Example 11 |
| --- | --- | --- |
| Filter Type | P3/F/P4 | P3/F(C)/P4 |
| P/F, mg | 43 | 42 |
| Carbon, mg | 0 | 35 |
| Acetaldehyde | −11% | −29% |
| Hydrogen Cyanide | 12% | −27% |
| 1,3-Pentadiene | −8% | −50% |
| 1,3-Butadiene | −21% | −30% |
| Isoprene | −14% | −46% |
| Acrolein | −27% | −56% |
| Benzene | −11% | −63% |
| Styrene | −22% | −91% |
| Hydrogen Sulfide | 34% | −34% |

In Table 2 the follow abbreviations are used:
P/F/P:plug/non-impregnated micro-cavity fiber/plug configuration
P/F (C)/P:plug/carbon imppregnated micro-cavity fiber/plug configuration In Example 11 of Table 3, 35 mg of coconut-based carbon dust was impregnated in 42 mg of point-bonded non-woven mat made of a 3 denier per filament (dpf) Triad™ micro-cavity fiber. This sample was then inserted in a space created in #1R4F reference cigarette filters by removing 43 mg of CA rod in the filter section. There was significant reduction in a wide variety of gas phase components from acetaldehyde to hydrogen sulfide. Example 10 is a comparative example showing that a much smaller component reduction effect was obtained using non-impregnated fiber for all the compounds shown in the table. The space in these experiments was created in a way so that the length of P3 is about 4 mm, P4 is 18 mm and the space between is about 4.5 mm.

The filtration efficiency and selectively can further be increased for a broader range of components if chemical reagents are co-impregnated with the solid fine powders as discussed by Xue et al in "Highly Efficient Acid-Gas Removing Shaped Fiber Filters", *Fundamental and Applied Aspects of Chemically Modified Surfaces;* The Royal Society of Chemistry, 1999, the content of which is incorporated herein by reference in its entirety. The surface of the impregnated solid fine powder adsorbent/absorbent may be chemically and/or physically modified to possess specific functional groups and structures to target certain components.

An APS silica gel was provided with its surface modified to possess an active —$NH_2$ primary amine group that can react selectively with mainstream smoke components such as hydrogen cyanide and acetaldehyde. The examples shown in Table 4, were created using a #2280 reference cigarette modified to have a P/S filter configuration. First, more than 20 blank #2280 reference cigarettes, "the control", were smoked under FTC conditions through a Cambridge pad and the gas phase component deliveries of methane, acetaldehyde, hydrogen cyanide, methanol and isoprene were measured. The total particulate matter ("TPM") was derived from the weight gained by the Cambridge pad as a result of the smoking. The averages, standard deviation ("SD") and relative standard deviation ("RSD") of the TPM and gas phase methane delivery numbers from these blank experiments are recorded in the lower portion of Table 4 and upper portion of Table 6. The change in deliveries data for acetaldehyde, hydrogen cyanide, methanol and isoprene recorded in Tables 4, 6 and 7 were numbers calibrated using the methane delivery number. The SD and RSD of these relative delivery numbers are also shown.

To examine the effects of absorbent/adsorbent impregnated micro-cavity fibers, an excess of powders of coconut carbon or APS silica gel (about 5–10 micron median diameter) were first mixed and shaken with micro cavity fiber bundles (3 dpf., PP, pre-cut to about 1 inch lengths) in a closed plastic bag. The powder loading was derived via the weight gain after the excess of the powder was removed by sieving through a #70 sieve. The Loading Factor was preferably maintained in the range of between about 0.5 to about 0.8 for the carbon powder and between about 0.5 to about 0.6 for the APS powder. The prepared fiber samples were then inserted into the filtration space in the #2280 cigarette filter after removing P1 and P2 plugs. The P2 plug was then reinserted into the cigarette filter to create a P2/F(x) configuration as described in Tables 4 and 6. The resulting cigarette was then tested under the well-known FTC testing protocols. Its TPM, percentage deviation of methane number and percentage deviation of acetaldehyde, hydrogen cyanide, methanol and isoprene delivery numbers as calibrated using methane as the internal standard are recorded in Tables 4 and 6.

TABLE 4

| FILTER TYPE | CARB. (MG) | MICRO CAVITY FIBER (MG) | CH4 | AA | HCN | MEOH | ISOPR | TPM (MG) |
|---|---|---|---|---|---|---|---|---|
| P2/F(c) | 25 | 106 | −3% | −29% | −69% | −43% | −45% | 9.2 |
| P2/F(c)* | 25 | 104 | 3% | −31% | −58% | −46% | −57% | 5.3 |
| P2/F(APS) | 25 | 96 | 1% | −36% | −75% | −13% | −32% | 9.0 |
| P2/F(APS) | 25 | 98 | 1% | −46% | −73% | −5% | −23% | 7.3 |
| P1/S/P2 avg. | 0 | 0 | 434 | 1.33 | 0.22 | 0.26 | 0.18 | 14.1 |
| SD | | | 30 | 0.08 | 0.03 | 0.02 | 0.02 | 1.0 |
| RSD | | | 7% | 6% | 12% | 7% | 11% | 7% |

For comparison, the loading of particles in these experiments was maintained at around 25 mg per 100 mg of fiber in the examples listed in Table 4. We considered the deviation percentage number for gas phase components significant only if the component's absolute values were larger than three times that of the corresponding Relative Standard Deviation (RSD). This was compared with blank P1/S/P2 filter. All four examples in Table 4 showed no significant increase in obstruction-to-flow performance when the P1 plug (77 mg) was replaced by about 100 mg of micro cavity fiber loaded with 25 mg of solid fine powders in P2/F(x) configuration. Methane delivery number changes are far less than the RSD. The powders were mostly retained in the internal space of the internal semi-open micro-cavities of the fibers, so they did not restrict the gas flow. APS silica gel powder selectively showed significant high percentage reductions for acetaldehyde (36–46%) and hydrogen cyanide (73–75%), but low non-significant percentage reduction numbers for methanol (5–13%) and isoprene (23–32%). Carbon powders show slightly lower and significant acetaldehyde (29–31%) and hydrogen cyanide (58–69%) reductions, but higher and significant reduction percentages for methanol (43–46%) and isoprene (45–57%). The selectivity of the filters for various components can be controlled by the adsorbent/absorbent material used. Additional examples using carbon or APS silica gel powder impregnated micro cavity fibers showing reduction in smoke gas phase compositions of acetaldehyde, hydrogen cyanide, methanol, and isoprene are found in Tables 6 and 7.

One additional objective of this invention is to develop cigarette smoke filters that can not only selectively reduce certain gas phase components, but also control the TPM delivery. A particular advantage of the novel cigarette filters of the present invention is that they permit adsorbent/absorbent materials to be fixed in a favorable configuration to interact with the gas stream without blocking the delivery of desirable components in the particulate phase of the smoke. Smoke particulate phase-passing paths can be controlled or optimized by modifying the fiber packing geometry and density for desirable TPM delivery in the same type of cigarette rods. This can be illustrated in the two examples shown in Table 4, where the included impregnated fibers were further cut to half lengths and packed tighter in the same space. The TPM delivery of the same type of cigarette could be greatly reduced from 9 mg to 5 mg due to smaller inter-fiber space while the reduction of the quantity of gas phase components do not show obvious change.

From the results shown in Table 5, we found that lowering the fiber-packing density could decrease TPM reduction. P2/F(x) configurations with less impregnated micro-cavity fibers allow larger smoke particulate phase deliveries. A series of examples of P2/F(x) filters constructed using the #2280 cigarette with decreasing fiber and carbon powder loadings were prepared and tested. The TPM and gas phase delivery data are recorded in Table 5. As expected, the TPM delivery increased rapidly as the loading decreased. At the same time, the gas phase component delivery also increased when less carbon was included for gas phase interaction.

TABLE 5

| CARBON (MG) | MICRO CAVITY FIBER (MG) | TOT.-L(MG) | TPM(MG) | AA($\mu$G) | HCN($\mu$G) | MEOH | ISOPR | CH$_4$ |
|---|---|---|---|---|---|---|---|---|
| 40 | 80 | 120 | 54 | 211 | 5.6 | 17 | 7 | 443 |
| 28 | 40 | 68 | 13.5 | 380 | 22 | 43 | 36 | 502 |
| 15 | 20 | 35 | 21.6 | 599 | 81 | 139 | 77 | 465 |
| 5 | 7 | 12 | 28.4 | 730 | 108 | 177 | 90 | 494 |
| 0 | 0 | 0 | 26 | 706 | 139 | 166 | 94 | 522 |

Figure 7:
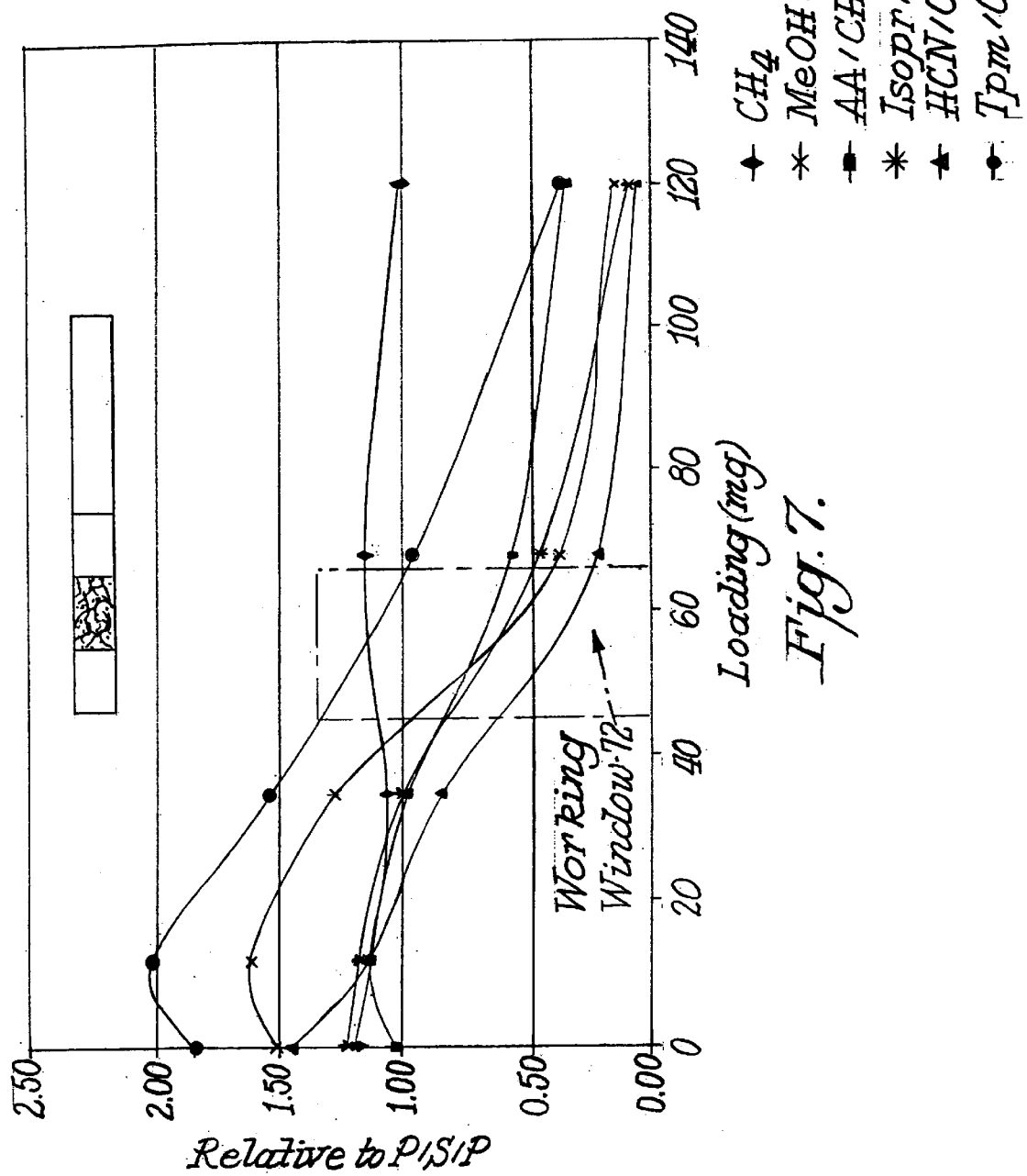
FIG. 7 is graph showing the relative filtration performance of a cigarette filter according to the invention.

In Table 5 the following abbreviations are used:
MEOH methanol
ISOPR isoprene
MG milligrams
$\mu$G micrograms FIG. 7 is a graph derived from the data in Table 5. It shows the effects of loading on the TPM and gas phase component delivery. In the graph, we have identified a preferred loading window 72 of 45–65 mg of carbon-impregnated fiber (containing about 26–38 mg of PP 3 dpf micro cavity fiber and 19–27 mg of carbon dust). In this loading range, the P2/F(x) configuration has not only reduced the targeted gas phase components of acetaldehyde, hydrogen cyanide, methanol and isoprene, but has also improved the TPM delivery. In the P2/F(x) configuration, the space occupied by the impregnated fiber is about 7.5 mm OD×18 mm (about 800 mm$^3$), so the preferred loading density for the 3-dpf micro cavity fiber is about 32.5–47.5 mg/cm$^3$. While optimum performance is observed in the loading window 72, the scope of the present invention comprehends using other loadings depending on the filtration performance desired.

To further explore the above-mentioned preferred loading window 72, additional examples of #2280 cigarette with the P2/F(x) filter configuration were prepared and tested. The results are included in Table 6. The results in Table 6 show that all the examples containing 31 or more mg of carbon loaded micro cavity fiber have significant gas phase component reductions. When the filters contained 40 or more mg of fiber, TPM reduction becomes significant. The examples using APS silica gel-loaded 3-dpf micro cavity fibers illustrated in the Table 7 showed the same trends. More interestingly, the delivery per TPM of certain gas phase components (such as acetaldehyde, hydrogen cyanide, methanol and isoprene) of the #2280 reference cigarette, as shown in Table 8, could be greatly decreased when the absorbent/adsorbent powder loaded micro-cavity fiber are used in a P2/F(x) configuration.

TABLE 6

The Reduction of the Quantities of Smoke Gas Phase Components from the use of Carbon powder Impregnated Micro-cavity fiber Under P2/F(x) Configuration in the #2280 Reference Cigarette

| Run | Filter Type | Carbon (mg) | F(mg) | TPM(mg) | CH4 | AA/CH4 | HCN/CH4 | MeOH/CH4 | Isopr/CH4 | TPM/CH4 |
|---|---|---|---|---|---|---|---|---|---|---|
| Control Average | P1/S/P2 | 0 | 0 | 14.1 | 440.7 | 1.33 | 0.21 | 0.25 | 0.17 | 0.032 |
| SD | | 0 | 0 | 1.1 | 28.8 | 0.08 | 0.03 | 0.04 | 0.02 | 0.001 |
| RSD | | | | 8% | 7% | 6% | 14% | 15% | 9% | 4% |
| Example 15 | P/F(c) | 25 | 106 | 9.2 | 420 | −29% | −67% | −41% | −43% | −32% |
| Example 16 | P/F(c) | 25 | 104 | 5.3 | 447 | −31% | −58% | −44% | −55% | −63% |
| Example 17 | P/F(c) | 40 | 80 | 5.4 | 443 | −64% | −94% | −85% | −91% | −82% |
| Example 18 | P/F(c) | 28 | 40 | 13.5 | 502 | −43% | −79% | −66% | −58% | −16% |
| Example 19 | P/F(c) | 21 | 40 | 12.6 | 479 | −28% | −62% | −34% | −47% | −15% |
| Example 20 | P/F(c) | 31 | 38 | 16.8 | 495 | −31% | −54% | −29% | −49% | 6% |
| Example 20A | P/F | 0 | 37 | 16.7 | 477 | +2.2% | +24% | +16% | 0 | +9% |
| Example 21 | P/F(c) | 27 | 36 | 13.8 | 438 | −43% | −59% | −19% | −54% | −2% |
| Example 22 | P/F(c) | 16 | 31 | 14.6 | 441 | −20% | −69% | −15% | −17% | 3% |
| Example 23 | P/F(c) | 15 | 20 | 21.6 | 465 | −3% | −17% | 20% | −3% | 45% |
| Example 24 | P/F(c) | 5 | 7 | 28.4 | 494 | 11% | 4% | 43% | 7% | 80% |
| Example 25 | P/S | 0 | 0 | 26 | 522 | 2% | 27% | 27% | 6% | 56% |

TABLE 7

The Reduction of the Quantities of Smoke Gas Phase Components from the use of APS Silica Gel Powder Impregnated Micro-cavity fiber Under P2/F(x) Configuration in the #2280 Reference Cigarette

| Run | Filter Type | APS.(mg) | F(mg) | TPM(mg) | CH4 | AA/CH4 | HCN/CH4 | MeOH/CH4 | Isopr/CH4 | TPM/CH4 |
|---|---|---|---|---|---|---|---|---|---|---|
| Average | P1/S/P2 | 0 | 0 | 14.1 | 440.7 | 1.33 | 0.21 | 0.25 | 0.17 | 0.032 |
| SD | | 0 | 0 | 1.1 | 28.8 | 0.08 | 0.03 | 0.04 | 0.02 | 0.001 |
| RSD | | | | 8% | 7% | 6% | 14% | 15% | 9% | 4% |
| Example 26 | P/F(APS) | 25 | 98 | 7.3 | 439 | −45% | −72% | −1% | −20% | −48% |
| Example 27 | P/F(APS) | 25 | 96 | 9.0 | 438 | −36% | −74% | −10% | −29% | −36% |
| Example 28 | P/F(APS) | 24 | 43 | 12.1 | 396 | −37% | −62% | 29% | 5% | −5% |
| Example 29 | P/F(APS) | 16 | 38 | 14.2 | 441 | −21% | −32% | 42% | 11% | 1% |

TABLE 8

Smoke Gas Phase Components Delivery Per TPM of #2280 Reference Cigarette with P2/F(x) Filters

| Run | Filter Type | Pdr.(mg) | Micro Cavity (mg) | TPM(mg) | AA/TPM | HCN/TPM | MeOH/TPM | Isopr/TPM |
|---|---|---|---|---|---|---|---|---|
| Average | P/S/P | 0 | 0 | 14.1 | 41.47 | 6.68 | 7.85 | 5.35 |
| SD | P/S/P | 0 | 0 | 1.1 | 2.32 | 0.87 | 1.00 | 0.38 |
| RSD | | | | 8% | 6% | 13% | 13% | 7% |
| CARBON | | | | | | Difference Relative to PSP | | |
| Example 3 | P/F(c) | 25 | 105 | 9.2 | 5% | −53% | −14% | −17% |
| Example 4 | P/F(c) | 40 | 80 | 5.4 | −6% | −84% | −60% | −76% |
| Example 5 | P/F(c) | 28 | 40 | 13.5 | −32% | −75% | −60% | −50% |
| Example 6 | P/F(c) | 31 | 38 | 16.8 | −35% | −57% | −33% | −52% |
| Example 6A | P/F | 0 | 37 | 16.7 | −6% | +11% | +9% | −9% |
| Example 7 | P/F(c) | 27 | 36 | 13.8 | −42% | −60% | −18% | −54% |
| Example 8 | P/F(c) | 16 | 31 | 14.6 | −23% | −71% | −18% | −21% |
| Example 9 | P/F(c) | 15 | 20 | 21.6 | −33% | −44% | −18% | −33% |
| Example 10 | P/F(c) | 5 | 7 | 28.4 | −38% | −43% | −21% | −41% |
| Example 11 | P/S | 0 | 0 | 26 | −34% | −20% | −19% | −33% |
| APS | | | | | | | | |
| Example 12 | P/F(APS) | 25 | 98 | 7.3 | 4% | −46% | 90% | 53% |
| Example 13 | P/F(APS) | 25 | 95 | 9.0 | 0% | −80% | 40% | 10% |
| Example 12 | P/F(APS) | 24 | 43 | 12.1 | −34% | −80% | 34% | 9% |
| Example 14 | P/F(APS) | 16 | 38 | 14.2 | −21% | −34% | 40% | 9% |

Figure 8:
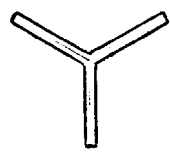
FIG. 8 is an enlarged elevational view of a trilobal fiber that serves as an example of fibers possessing open micro cavities that can be used in the invention.
Figure 9:
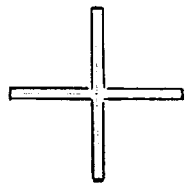
FIG. 9 is an enlarged elevational view of a quadrilobal fiber that serves as an example of fibers possessing open micro cavities that can be used for the invention.
Figure 11:
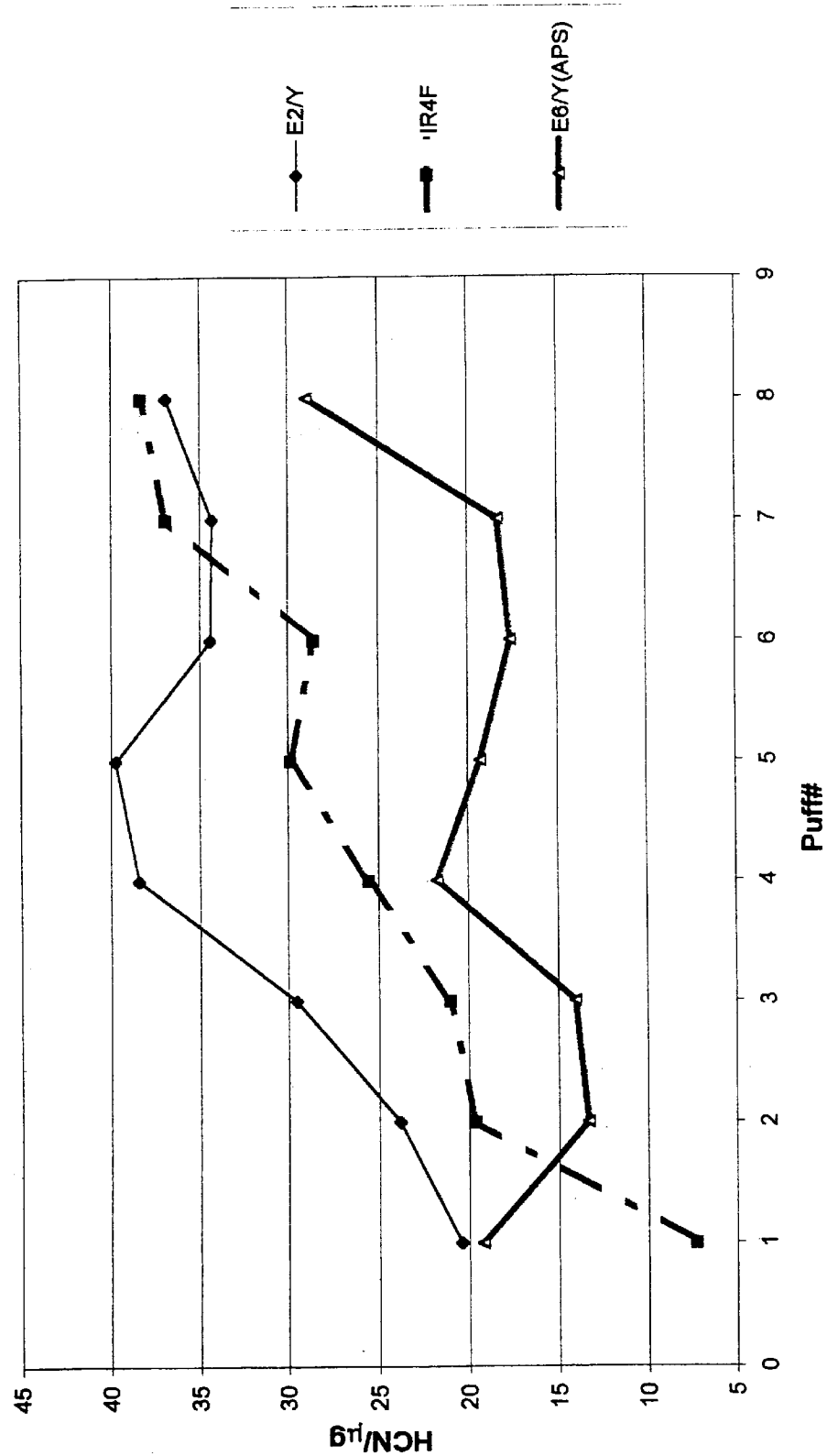
FIG. 11 illustrates the effects of APS in CA Filter on HCN Puff-by-Puff Delivery.
Figure 12:
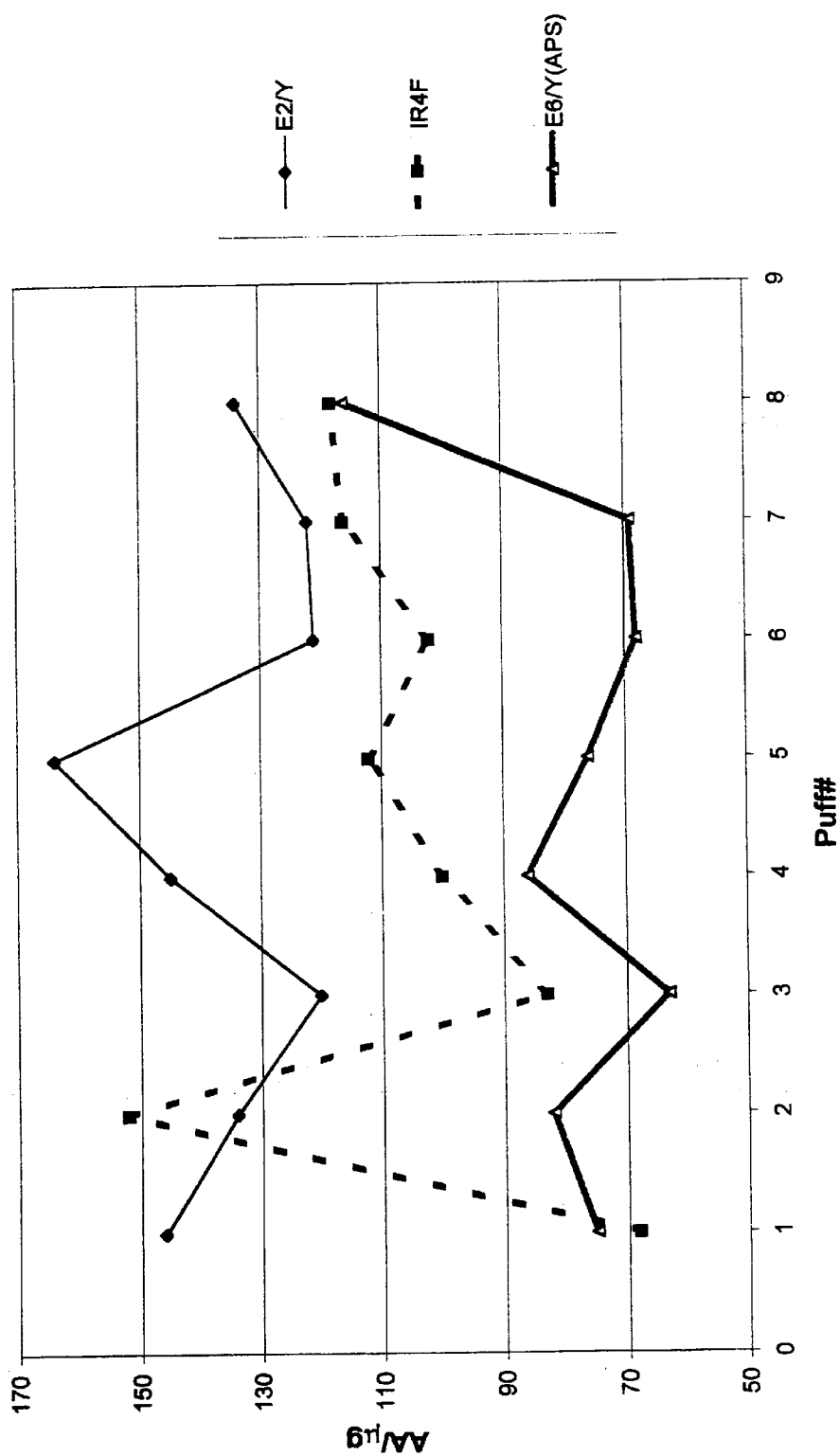
FIG. 12 illustrates the effects of APS in CA Filter on AA Puff-by-Puff Delivery.
Figure 13:
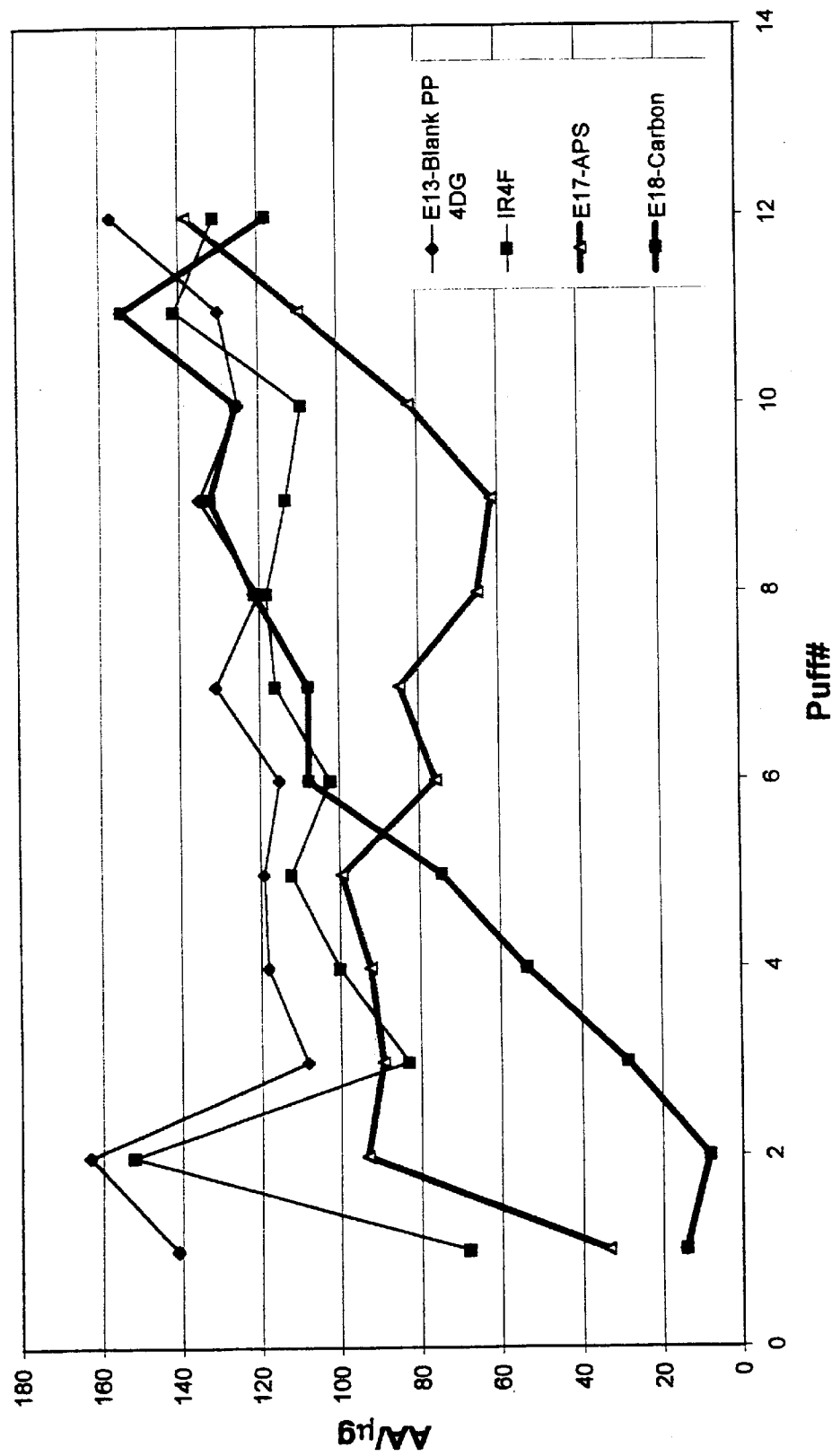
FIG. 13 illustrates a Puff-by-Puff comparison on PP 4DG filter performance on AA Delivery.
Figure 14:
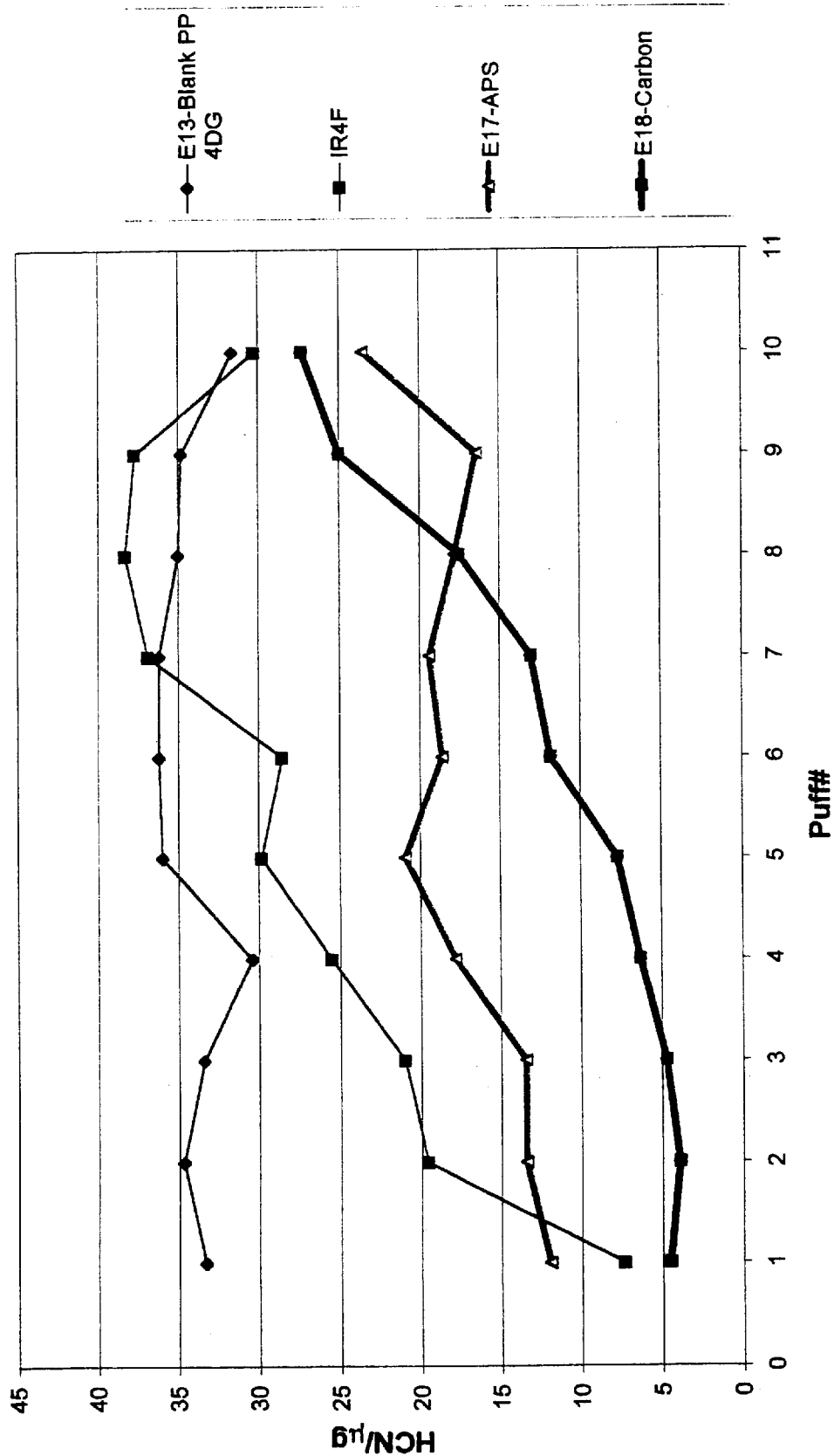
FIG. 14 illustrates a Puff-by-Puff comparison on PP 4DG filter performance on HCN Delivery.

The open micro-cavity fibers, can be any shape as long as it meets the definition of open micro-cavity. It is only important that the fiber has open micro-cavities to permit impregnation of the fiber with silicon, carbon or a mixture of. For example open micro-cavities can conventional Y shaped Cellulose Acetate fibers as illustrated in FIG. 8, or quad lobal shape as illustrated in FIG. 9, a 4-DG shaped Polypropylene (PP) fibers from Filtration Innovation Technology Inc. (FIT) or one of the shapes described in one of the Eastman Chemical Patents above (such as FIG. 10).

We have also discovered when the absorbent particles used are small enough to be able to be impregnated into the internal micro-cavities of the fibers, they will not obstruct gas flow between fibers. By controlling the density and distribution of the fibers, high RTD could be avoided in forming effective gas filter. To be impregnated into the surface cavities of the conventional 3 dpf CA "Y" shaped fibers, the fine particles of adsorbents carbon or silica gel used should be smaller than 10 um in diameter. For larger fibers such as 15 dpf 4DG shaped polypropylene ("pp") fibers, the suitable particle size may be larger up to 20 $\mu$m in diameter.

The tested particles in the following examples were coconut carbon powders from Pica and APS (3-aminopropylsilanol) treated silica gel from Grace Davison. The particle impregnated shaped fibers were prepared in following procedure: A certain weight in grams, $W_0$, of the above fiber is mixed with excess solid powder in a sealed plastic bag. After complete shaking and mixing, and in some cases hand squeezing, the mixture was passed through in a #20 sieve. Further excess powder in the fibers was dusted off in a hood. The sample was then weighed and the weight changed to $W_1$ (in grams) and the percentage gain through this process was recorded as particle retention. The particle retention data from examples are as listed in Table 9. It is clear that these particles are impregnated in the internal space between the lobes of filaments, so they are not obstructing the gas flow between the fibers.

TABLE 9

Particle Retention Capability of Various Shaped Fiber Samples

| Example | Fiber | $W_0$ | Particle | $W_1$ | Retention % |
|---|---|---|---|---|---|
| 1 | CA/Y[2] | 179.72 | APS[4] | 195.71 | 9.20 |
| 2* | CA/Y | 840.51 | APS | 1052.50 | 22.0* |
| 3 | CA/Y | 581.98 | Carbon[3] | 640.83 | 10.11 |
| 4 | CA/Y | 1918.5 | Carbon | 2119.5 | 10.48 |
| 5 | CA/Y | 185.97 | Carbon | 206.63 | 11.10* |
| 6 | PP/4DG[1] | 246.73 | APS | 332.33 | 34.70 |
| 7 | PP/4DG | 246.06 | APS | 348.86 | 40.50 |
| 8* | PP/4DG | 270.91 | APS | 412.47 | 52.25* |
| 9* | PP/4DG | 302.31 | APS | 480.42 | 58.91* |
| 10 | PP/4DG | 266.68 | Carbon | 396.47 | 48.67 |
| 11 | PP/4DG | 272.83 | Carbon | 447.12 | 63.88* |
| 12 | PET/4DG[1] | 251.94 | APS | 301.90 | 19.50 |

*Certain hand squeezing in addition to shaking was applied during powder impregnation.
[1]The PP/4DG fiber is sample DPL-283, crimped 15 dpf, 2-in long filaments; and PET/4DG is from sample DPL-672, a 6dpf, 31-filament Yarn; both from FIT.
[2]CA/Y is Cellulose Acetate tri-lobal fiber currently used in Cigarette plug manufacturing
[3]Carbon powder is coconut shell based carbon dust #99-2-3 (particles diameter ranged from 1–10 micrometers) from Pica.
[4]APS silica gel powder was 3-aminopropylsilanol treated silica gel powder from Grace Davison.

The particle retention of fibers with open micro-cavities depends not only on a geometrical match between the particles and the micro-cavities on the fibers, but also on the impregnation procedure. As shown in Table 9, certain level of mechanical squeezing by hands could improve the retention of the particles significantly. 3 dpf/Y shaped CA fiber could retain 9–22% of APS silica gel powder depending on the force applied in impregnation, while its retention for the coconut carbon dust is only around 10% because of less geometrical match. Almost all of the APS silica gel particle used have diameters in the range of 2–4 um. The carbon dusts used, however, are irregularly shaped, and some of them had single direction dimension exceeding 5 um, the depth of the cavities of on 3 dpf Y shaped CA fibers. This makes the carbon dust harder to pack into the small shallow space between lobes of the CA fiber even with mechanical force. For fibers with deeper micro-cavities such those in the 15 dpf PP 4DG fibers, both powders used here should be able to packed into the cavities. As expected, higher retention number in the range of 30–70% were obtained. The tested 6 dpf PET/4DG fibers showed lower particle retention than 15 dpf PP/4DG fibers for shallower micro-cavities.

To form effective gas phase filtration filters, some of the above-prepared fibrous materials were used to replace the CA plugs in the filter sections of 1R4F cigarettes. After their RTD and Dilution Index (DDI) of the resulted cigarette samples were determined reasonable, they were smoked under a Protocol that puffs 55 ml for 2 seconds in intervals of 30 seconds between the puffs. The total particulate matter (TPM) was collected on a Cambridge Pad while the gas phase components were measured by a calibrated Laser FT-IR system. The results are recorded in Table 10 and FIGS. 11 to 16.

regular CA plug was added as a mouthpiece, so the listed CA fiber and APS powder was compressed in a 22-mm long section. These compression results in slightly higher RTD and lower TPM delivery, but both values are still comparable to that of regular 1R4F. The effects of thus included APS powder to gas phase components can be clearly shown by AA and HCN puff-by-puff delivery data in FIGS. 11 and 12. Under equal RTD, with APS in filter, E6 showed significantly reduced AA and HCN puff-by puff delivery than that of both E2 and regular 1R4F controls.

Cigarette samples E8–11 were prepared from carbon powder impregnated CA fibers from Example 4 and 5 (Table 10) using the process described in E1–4. Because of low particle retention, only 13 to 18 mg of carbon powders were included in the samples. Higher fiber loading in E10 and E11 resulted in higher carbon loading, but their RTD and TPM were both off the comparative range to 1R4F. With lower fiber loading, E8 and E9 have comparable RTD and TPM

TABLE 10

Data from Smoking 1R4F Cigarettes with Replaced Filters

| Example/Ref. | Fiber | Shape/Pdr. | Fiber/mg | pdr./mg | DDI/% | RTD/in. H2O | TPM(mg)/Puff |
|---|---|---|---|---|---|---|---|
| IR4F Range | CA(plasticized) | Y | 186–194 | 0 | 26–32 | 128–149 | 1.88–2.85 |
| E1/9598-52-3 | CA | Y | 145 | 0 | 19 | 121 | 3.43 |
| E2/9598-52-4 | CA | Y | 154 | 0 | 21 | 129 | 3.20 |
| E3/9598-52-1 | CA | Y | 229 | 0 | 27 | 203 | 2.12 |
| E4/9598-52-2 | CA | Y | 229 | 0 | 24 | 230 | 1.78 |
| E5/9598-52-6 | CA/Examp-2 | Y(APS) | 104 | 23 | 27 | 93 | 2.37 |
| E6/9598-52-5 | CA/Examp-2 | Y(APS) | 178 | 39 | 25 | 121 | 2.11 |
| E7/9598-52-7* | CA/Examp-2** | P/Y(APS) | 106 | 23 | 22 | 143 | 1.89** |
| E8/9598-44-4 | CA/Examp-5 | Y(Carbon) | 120 | 13 | 22 | 118 | 2.18 |
| E9/9598-44-3 | CA/Examp-5 | Y(Carbon) | 130 | 14 | 22 | 146 | 2.08 |
| E10/9598-43-5 | CA/Examp-4 | Y(Carbon) | 160 | 17 | 29 | 174 | 1.68 |
| E11/9598-43-3 | CA/Examp-4 | Y(Carbon) | 167 | 18 | 28 | 183 | 1.47 |
| E12/9598-53-1 | PP | 4DG | 167 | 0 | 21 | 178 | 3.41 |
| E13/9598-53-3 | PP | 4DG | 155 | 0 | 21 | 133 | 3.38 |
| E14/9598-53-2 | PP | 4DG | 143 | 0 | 21 | 108 | 3.89 |
| E15/9598-53-8 | PP/Examp-7 | 4DG(APS) | 104 | 36 | 25 | 95 | 3.06 |
| E16/9598-53-6 | PP/Examp-8 | 4DG(APS) | 103 | 57 | 18 | 106 | 3.36 |
| E17/9598-53-7 | PP/Examp-8 | 4DG(APS) | 109 | 60 | 24 | 116 | 2.51 |
| E18/9598-54-1 | PP/Examp-11 | 4DG(C) | 97 | 62 | 21 | 126 | 2.91 |

*Under Smoking Conditions of 55 ml/2s per puff with 30s interval between puffs
**Filter length 22 mm with additional 5 mm CA plasticized plug.

The 1R4F range values listed in Table 10 were derived from more than 10 replica samples smoked in between other sample runs. Their filters were made using plasticizers. To isolate the effects of plasticizers, in example E1 to E4, 1R4F cigarette samples with filters were made from virgin CA fibers without the use plasticizers. The procedure of preparing these samples started with the step of pulling a quantity of tow fibers through a pre-made cylindrical tipping paper wrap with a hook. After trimming, the homogeneous parts of the wrapped filters were cut into 27 mm long sections and inserted into 1R4F cigarettes to replace the original CA filters. CA fiber weight values listed are actual fiber weight derived from the total filter weight excluding the tipping wrap weight of about 37.5 mg. Because of higher CA fiber loading, E3 and E4 had higher RTD and lower TPM delivery than E1 and E2. These samples may serve as a better control than regular 1R4F to show the effects of included powders in following cigarette samples prepared under similar conditions.

In cigarette samples E5 and E6, APS silica gel powder impregnated CA fiber from Example 2 (Table 10) was used in preparing their 27 mm-long filters. Depending on fiber loading, 23 to 39 mg of APS silica gel powders were included in the filters after the process. In E7, a 5-mm-long values to that of 1R4F samples. Duplicate samples of E8 and E9, E8A and 9A were prepared to assess the effectiveness of the included carbon powders. Under FTC conditions, the $4^{th}$ puff of the cigarette was analyzed with ("GC/MS") method. Using ethane as internal standard and 1R4F cigarette as the control, a selected list of gas phase smoke constituents were reduced in the delivery of these two samples are listed in Table 11. The listed values listed Table 11 are only used to demonstrate the concept of benefits from including carbon in the cigarette filters in this art. We believe these values can be further magnified if the carbon powder retention is increased with smaller carbon particles or larger CA fibers.

TABLE 11

Effects of Including Fine Carbon
Particles on Smoke Component Change

| Sample | IR4F | E9A/9598-44-1 | E8A/9598-44-2 |
|---|---|---|---|
| Filter Type | CA-Plasticized | CA/Y(Carbon)** | CA/Y(Carbon)** |
| CA/mg | 186–194 | 136 | 122 |
| Carbon/mg | 0 | 15 | 13 |
| RTD/mmH2O | 128–149 | 128 | 120 |

TABLE 11-continued

Effects of Including Fine Carbon
Particles on Smoke Component Change

| Sample | IR4F | E9A/9598-44-1 | E8A/9598-44-2 |
|---|---|---|---|
| DDI/% | 25–30 | 22 | 22 |
| Acrolein | Control | −22.3% | −18.8% |
| 1,3-Butadiene | Control | −23.7% | −11.4% |
| Isoprene | Control | −36.6% | −14.2% |
| Cyclopentadiene | Control | −32.2% | −17.5% |
| AA | Control | −10.5% | −8.9% |
| 2,4-hexadienal | Control | −24.4% | −11.5% |
| CH2Cl2 | Control | −41.7% | −98.1% |
| Styrene | Control | −35.5% | −19.2% |
| O-xylene | Control | −37.6% | −32.3% |
| Me-Mercaptan | Control | −22.9% | −10.6% |
| COS | Control | −21.1% | −14.8% |

*4th puff under FTC condition, GC/MS detector/ethane internal
**Plug with 37.5 mg of tipping paper wrap.

E12–14 of Table 10, are control cigarette samples prepared from inserting virgin crimped 15 dpf PP 4DG-fiber sample into the 1R4F filter sections. As expected, the more virgin fibers loaded, the higher the RTD is. E15–18 of Table 10, are cigarette samples prepared from APS powder or carbon powder loaded 4DG PP fibers obtained from examples 7, 8 and 11 in Table 10. Because of large fiber and deep cavities available in these fibers, good particle retention (up to 64%) for both carbon and APS were achieved. Under comparable RTD and TPM delivery, high volume (up to 60 mg) of carbon or APS powder could be loaded into each cigarette.

Figure 15:
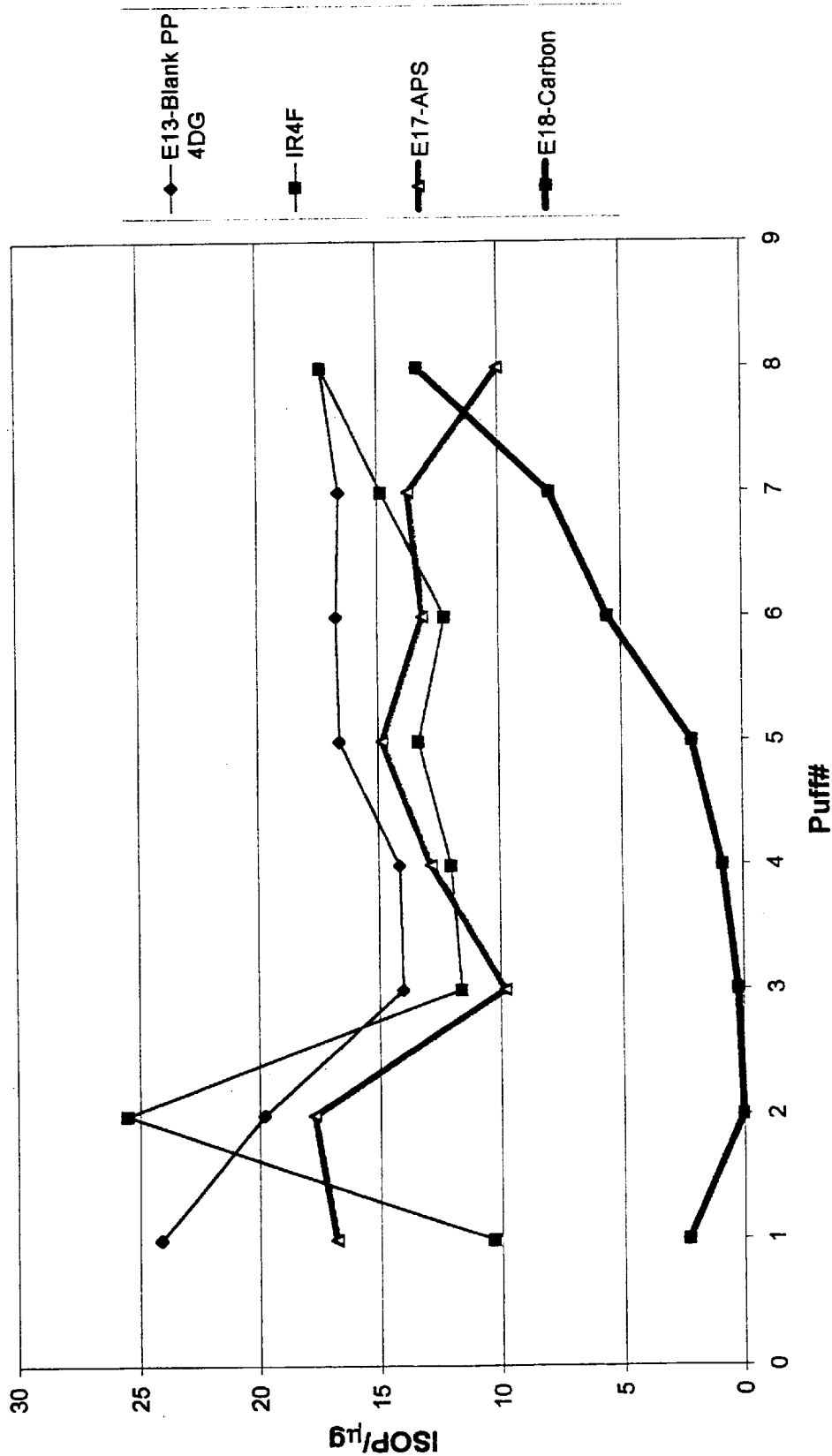
FIG. 15 illustrates a Puff-by-Puff comparison on PP 4DG filter performance on Isoprene Delivery.
Figure 16:
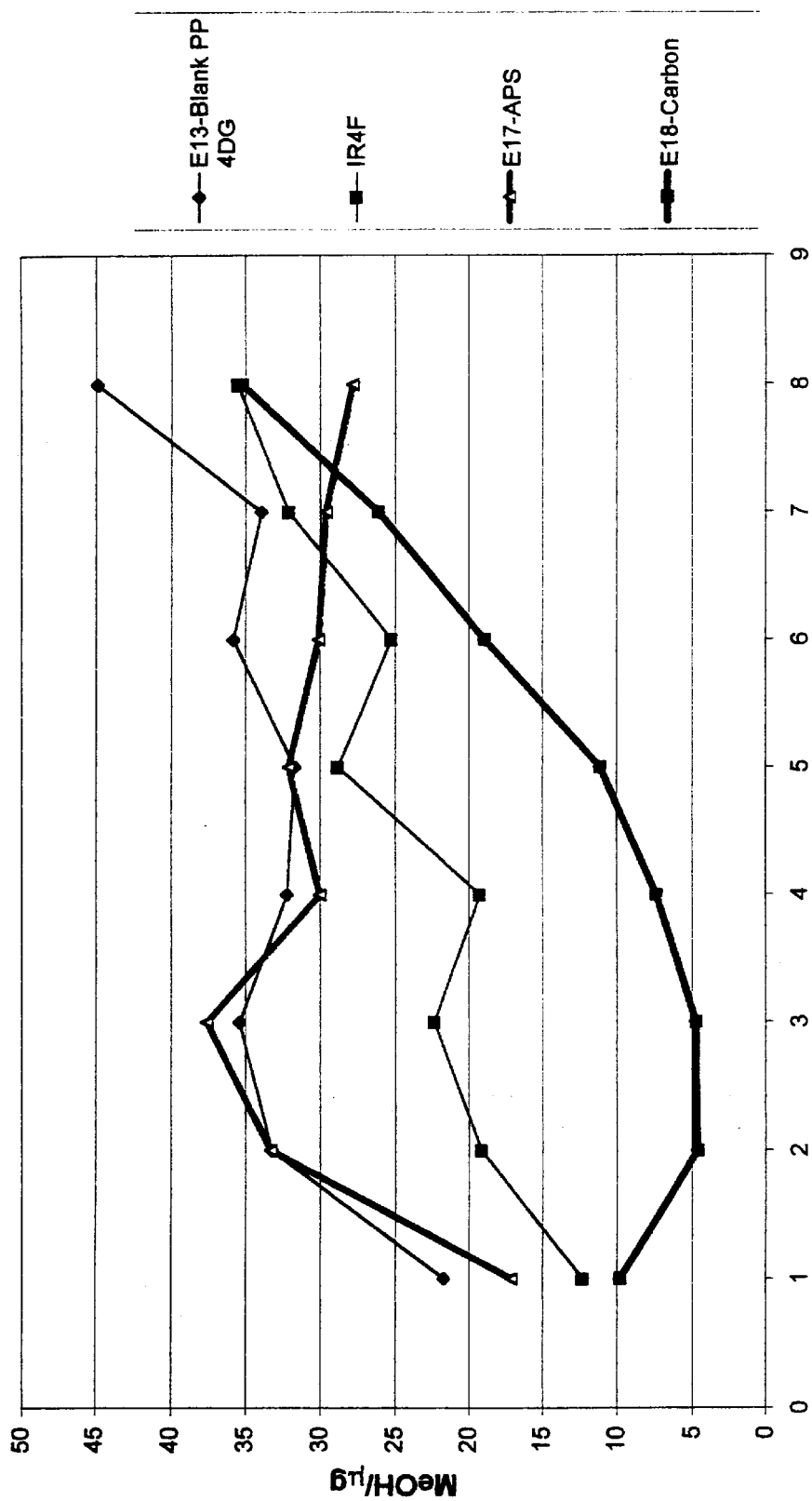

The effects of the loaded absorbent particles to gas phase constituents can be demonstrated in data shown in FIGS. 13–16. Generally, carbon showed broader activity to wider range of compounds via physical adsorption process, while the surface treated APS powders showed selected activity to certain constituents, such as aldehydes and HCN via chemical reaction processes. In FIGS. 15 and 16, it is clear that carbon powder has activity in removing compounds such as isoprene and methanol while APS powder showed no significant activity under the same condition of testing. In removing the same compounds, they showed different reaction kinetics and activity. This difference can be demonstrated in the puff-by puff delivery data for acetaldehyde (AA) in FIG. 13. Carbon showed a typical physical absorption characteristics, which absorbed most of the AA in the first and 2nd puffs, then gradually reached saturation after $6^{th}$ puffs. APS silica gel had much less physical surface, which was used up very quickly in first puff. Due to a slow chemical reaction rate, the reaction between amine group on APS powder and AA did not function until 5th puff. Maximum reduction of AA delivery reached in about $9^{th}$ puff. Similar difference between carbon and APS powder can also be found in their puff-by-puff HCN delivery data shown in FIG. 14, where the saturation of physical surface for both carbon and APS powders were slower due to lower challenge level.

Additional examples of shaped fiber filters containing mixtures of powders were prepared as follows:

2.0 g of 5 different compositions of powder mixtures were prepared by mixing and shaking 0, 0.5, 1.0, 1.5 and 2.0 g of APS silica gel powder (Grace Davison) with 2.0, 1.5, 1.0, 0.5 and 0 g of Pica coconut carbon dust #99–2–3, respectively, in five commercial 3-5 zip lock plastic bags. The powder mixtures were mixed and shaken in the bags.

The powders were impregnated into the fibers by inserting 0.5 g of PP 4DG fiber (15 dpf crimped, 2-inch long, #DPL 283 from FIT) into each of the five bags containing the powder and sealed. After shaken without hand pressing, the fiber and powder mixtures were poured onto a No. 40 sieve. The excess powder was removed by shaking and dusting. This was done until there was no observed dropping powder when dropped onto a piece of white paper. The percentage weight gain of the samples through the process was recorded as the Loading Factor in FIG. 17.

The cigarettes were altered first, by using a twister to remove the CA filter plugs from #1R4F research cigarettes, leaving a 27-mm long hollow section. Then a certain amount of above impregnated fiber samples were slowly inserted into this hollow section to serve as filter. The resistance to draw ("RTD") and Direct Dilution Index ("DDI") of the resulted samples were measured using a CFO ANALOGIC Champion™ Series tester and recorded in Table 12. The cigarette samples prepared here had comparable RTD (127–152 mmH$_2$O) and Dilution index (24–31%) to that of standard 1R4F as shown Table 12. Table 12 illustrates the effect of loading mixed APS and carbon powder on total 1R4F Delivery under FTC conditions.

TABLE 12

Effect of Loading Mixed APS and Carbon Powder on Total 1R4F Delivery Under FTC Condition

| Run | APS/C | Pdr (mg) | PP-4DG (mg) | TPM (mg) | AA (µg) | HCN (µg) | MeOH | Isopr. | CH4 | Puff | BT/min | day | AA/CH4 | HCN/CH4 | MeOH/CH4 | Isopr/CH4 | DdI | RTD |
|---|---|---|---|---|---|---|---|---|---|---|---|---|---|---|---|---|---|---|
| Conbtrol 1R4F | | | | | | | | | | | | | | | | | | |
| Average | | 0 | 0 | 13.0 | 527.9 | 75.2 | 65.0 | 65.9 | 365.7 | 9.2 | 8.3 | | 1.44 | 0.21 | 0.18 | 0.18 | | |
| SD | | 0 | 0 | 0.5 | 70.7 | 12.6 | 10.3 | 6.1 | 29.5 | 0.4 | 0.5 | | 0.12 | 0.03 | 0.02 | 0.00 | | |
| RSD | | 0 | 0 | 4% | 13% | 17% | 16% | 9% | 8% | 4% | 6% | | 8% | 12% | 10% | 3% | | |
| DPL 283 PP-4DG stuffed filter | | | | | | | | | | | | | Change | | | | | |
| 9563-80-A | 100/0 | 40.3 | 155 | 9.7 | 296.9 | 21.91 | 60.9 | 57.24 | 355.3 | 9 | 8.8 | 4 | −42% | −70% | −3% | −11% | 31 | 132 |
| 9563-80-B | 100/0 | 40.0 | 154 | 10.8 | 409 | 33.79 | 78.3 | 70.79 | 407.8 | 10 | 9.0 | 4 | −30% | −60% | 8% | −4% | 30 | 141 |
| 9563-80-C | 75/25 | 39.0 | 152 | 13.6 | 393.7 | 36.49 | 74.6 | 53.84 | 433.1 | 10 | 9.0 | 4 | −37% | −59% | −3% | −31% | 24 | 140 |

TABLE 12-continued

Effect of Loading Mixed APS and Carbon Powder on Total 1R4F Delivery Under FTC Condition

| Run | APS/C | Pdr (mg) | PP-4DG (mg) | TPM (mg) | AA (μg) | HCN (μg) | MeOH | Isopr. | CH4 | Puff | BT/min | day | AA/CH4 | HCN/CH4 | MeOH/CH4 | Isopr/CH4 | DdI | RTD |
|---|---|---|---|---|---|---|---|---|---|---|---|---|---|---|---|---|---|---|
| 9563-80-D | 75/25 | 40.3 | 158 | 10.6 | 470.3 | 46.67 | 65.08 | 51.23 | 435.4 | 11 | 9.9 | 4 | −25% | −48% | −16% | −35% | 31 | 152 |
| 9563-80-E | 50/50 | 40.8 | 152 | 11.9 | 447.5 | 44.96 | 80.14 | 46.01 | 442.5 | 10 | 9 | 10 | −30% | −51% | 2% | −42% | 24 | 127 |
| 9563-80-F | 50/50 | 41.5 | 154 | 11.9 | 471.2 | 51.11 | 72.14 | 48.97 | 444.7 | 10 | 9 | 10 | −26% | −44% | −8% | −39% | 30 | 137 |
| 9563-80-G | 25/75 | 41.5 | 153 | 11.5 | 428.9 | 54 | 65.76 | 39.34 | 428 | 10 | 9.0 | 10 | −30% | −39% | −13% | −49% | 30 | 128 |
| 9563-80-H | 25/75 | 41.3 | 152 | 12.3 | 430.9 | 64.83 | 67.29 | 36.96 | 422.5 | 10 | 9.0 | 10 | −29% | −25% | −10% | −51% | 30 | 128 |
| 9563-80-I | 0/100 | 42.3 | 154 | 13.1 | 317.8 | 37.73 | 46.39 | 22.92 | 435.8 | 10 | 9.0 | 10 | −49% | −58% | −40% | −71% | 25 | 129 |
| 9563-80-J | 0/100 | 42.4 | 154 | 13.6 | 357.1 | 57.84 | 49.1 | 24.01 | 412.1 | 9 | 8.8 | 10 | −40% | −32% | −33% | −68% | 24 | 127 |

*Under FTC Smoking Conditions
**Filter configuration:

The cigarette samples were equilibrated in a control room under a temperature of 72° F. and relative Humidity of 60% for at least 24 hours before smoked under FTC conditions with an electric lighter. The total particulate matter ("TPM") from smoking was collected on and measyreed by weighting Cambridge pads. Gas phase composition of the smoke was analyzed with a calibrated laser Infrared system. Selected data from the testing are as shown in Table 12 and the Tables 13–16 below.

TABLE 13

| AA (μg) Puff | 9563-80L IR4F | 9563-80-B APS100/C0 | 9563-80-C APS75/C25 | 9563-80-F APS50/C50 | 9563-80-H APS25/C75 | 9563-80-J APS0/C100 |
|---|---|---|---|---|---|---|
| 1 | 26.47 | 19.96 | 16.34 | 23.54 | 23.13 | 18.37 |
| 2 | 81.71 | 15.55 | 11.14 | 17.74 | 20.79 | 11.64 |
| 3 | 66.94 | 21.52 | 11.21 | 21.86 | 26.24 | 14.19 |
| 4 | 56.91 | 30.7 | 16.07 | 32.34 | 24.11 | 30.09 |
| 5 | 69.15 | 31.05 | 30.23 | 46.67 | 42.49 | 46.42 |
| 6 | 74.64 | 40.58 | 47.48 | 58.91 | 35.19 | 42.76 |
| 7 | 76.54 | 49.59 | 55.63 | 57.39 | 53.29 | 53.45 |
| 8 | 69.24 | 67.5 | 44.21 | 71.26 | 77.05 | 64.46 |
| 9 | 95.52 | 62.4 | 72.52 | 60.85 | 60.35 | 75.7 |
| 10 | | 61.12 | 88.84 | 80.59 | 68.26 | |

TABLE 14

| HCN (μg) Puff | 9563-80L IR4F | 9563-80-B APS100/C0 | 9563-80-C APS75/C25 | 9563-80-F APS50/C50 | 9563-80-H APS25/C75 | 9563-80-J APS0/C100 |
|---|---|---|---|---|---|---|
| 1 | 4.98 | 1.74 | 1.64 | 2.57 | 4.51 | 3.36 |
| 2 | 7.13 | 0.75 | 0.85 | 1.18 | 2.35 | 1.94 |
| 3 | 8.73 | 0.85 | 0.97 | 1.54 | 2.86 | 1.45 |
| 4 | 8.56 | 1.55 | 2.00 | 2.99 | 2.78 | 3.67 |
| 5 | 10.24 | 2.45 | 2.66 | 2.59 | 5.21 | 4.91 |
| 6 | 12.31 | 3.53 | 3.27 | 4.83 | 4.38 | 5.87 |
| 7 | 13.72 | 4.84 | 5.08 | 6.1 | 9.04 | 9.31 |
| 8 | 12.12 | 5.99 | 3.58 | 7.15 | 11.03 | 13 |
| 9 | 15.68 | 6.09 | 6.98 | 8.49 | 11.02 | 14.33 |
| 10 | | 6.00 | 9.48 | 13.67 | 11.65 | |

TABLE 15

| ISOP Puff | 9563-80L IR4F | 9563-80-B APS100/C0 | 9563-80-C APS75/C25 | 9563-80-F APS50/C50 | 9563-80-H APS25/C75 | 9563-80-J APS0/C100 |
|---|---|---|---|---|---|---|
| 1 | 4.41 | 2.86 | 1.75 | 1.46 | 2.2 | 2.1 |
| 2 | 11.9 | 9.87 | 0.1 | 0.04 | 0.18 | 0 |
| 3 | 7.3 | 6.7 | 0.51 | 0.73 | 0.76 | 0 |
| 4 | 8.24 | 6.48 | 1.37 | 1.89 | 1.53 | 0 |

TABLE 15-continued

| ISOP Puff | 9563-80L IR4F | 9563-80-B APS100/C0 | 9563-80-C APS75/C25 | 9563-80-F APS50/C50 | 9563-80-H APS25/C75 | 9563-80-J APS0/C100 |
|---|---|---|---|---|---|---|
| 5 | 9.2 | 6.6 | 4.1 | 2.79 | 2.86 | 0.76 |
| 6 | 7 | 6.85 | 6.11 | 5.14 | 2.86 | 2.08 |
| 7 | 9.11 | 6.52 | 8.77 | 7.16 | 5.08 | 4.05 |
| 8 | 8.53 | 9.05 | 7.28 | 10.24 | 7.4 | 5.95 |
| 9 | 9.29 | 8.63 | 10.87 | 8.86 | 6.22 | 9.07 |
| 10 | | 7.25 | 13.2 | 10.66 | 7.89 | |

TABLE 16

| MEOH Puff | 9563-80L IR4F | 9563-80-B APS100/C0 | 9563-80-C APS75/C25 | 9563-80-F APS50/C50 | 9563-80-H APS25/C75 | 9563-80-J APS0/C100 |
|---|---|---|---|---|---|---|
| 1 | 4.4 | 4.2 | 4.07 | 4.92 | 6.01 | 4.85 |
| 2 | 5.66 | 4.29 | 1.89 | 3.14 | 2.85 | 2.64 |
| 3 | 6.75 | 5.49 | 1.98 | 3.3 | 2.96 | 2.47 |
| 4 | 6.48 | 5.27 | 3.56 | 4.65 | 3.51 | 1.77 |
| 5 | 8.3 | 5.92 | 4.49 | 4.64 | 3.86 | 3.59 |
| 6 | 9.5 | 7.9 | 7.56 | 7.42 | 4.87 | 4.64 |
| 7 | 11.36 | 7.77 | 9.15 | 9.02 | 7.12 | 6.9 |
| 8 | 11.86 | 10.53 | 10.47 | 10.94 | 9.72 | 9.43 |
| 9 | 18.73 | 13.24 | 12.92 | 9.88 | 11.52 | 13.01 |
| 10 | | 13.71 | 18.53 | 14.23 | 14.87 | |

FIG. 17 illustrates the effect of particle composition on loading factor in the PP-4DG fiber. There was no significant difference in loading factor from 100% APS particles to 100% carbon. The percentage loading of all of the five compositions narrowly ranged from 25.6 to 27.5%.

Table 12 summarizes the data from smoking the above prepared cigarette samples under FTC conditions. Using total Methane ($CH_4$) delivery as internal standard, the total AA, HCN, MeOH and Isoprene deliveries of the cigarette were compared with the corresponding average numbers from smoking 6 control 1R4F cigarette at the sample time. The percentage difference from above comparison is deemed significant if its absolute values were greater than 3 times of that of the relative standard deviation number from smoking the control 1R4F samples.

From Table 12, it is clear that 100% carbon loading showed significant reduction to AA, HCN, MeOH and isoprene while 100% APS silica gel powder only showed significant reduction to AA and HCN. The three mixture compositions showed significant, but no better reduction to AA and HCN than pure carbon or APS powder samples. Interestingly, the mixture comparison also showed significant reduction to isoprene but not to MeOH. The mixtures seem to have higher selectivity to isoprene over MeOH than both carbon and APS silica gel. Because of the change in filtration selectivity among different smoke components, the delivered component portfolio will be altered. This may provide a tool for adjusting cigarette taste.

Tables 13–16 show puff by puff delivery data of AA, HCN, Isoprene and MeOH of the cigarette samples respectively. As shown in Table 13, all five compositions showed most AA in the first 3–4 puffs and gradually lost their activity in later puffs. There was no significant difference in AA puff by puff delivery curves among the five compositions. As shown in Table 14, APS silica gel powder has higher activity to HCN than carbon powder, especially in later puffs (Puffs 7–9), while all mixture compositions showed activity level in-between these two pure samples. In Tables 15 and 16, in the APS silica gel showed no significant activity to both isoprene and MeOH while carbon showed good reduction to these two components. The mixture compositions showed various level of activity to isoprene and MeOH in between that of only carbon powder and APS silica gel powder.

It is possible to create varied delivered smoke composition portfolio by using mixture from different absorbents such as APS silica gel powder and coconut carbon powder. The mixtures of APS silica gel powder and carbon powder showed varied levels of filtration activity in between that of pure forms of carbon or APS silica gel. Using mixtures of varied compositions from different absorbents in the shaped fiber filter may lead to different smoke tastes from using just the pure forms.

In conclusion, we have demonstrated that shaped fibers with open or semi-surface micro-cavities could be used to prepare improved filters for gas phase filterations. Their micro-cavities could be used to retain fine absorbent particles such as carbon and APS silica gel powders or mixtures thereof without incurring high RTD. Cigarette filters made from these impregnated fibers without plasticizer have shown higher effectiveness in removing certain cigarette smoke constituents than conventional CA filters in 1R4F cigarettes. Depending on the surface characteristic of the impregnated solid powders, the removal of gas phase components can be realized via either physical adsorption or chemical reaction mechanism. By selecting the reaction mechanism, certain components of the smoke cigarette may be selectively removed.

The present invention provides highly efficient cigarette filters having the ability to remove selectively certain mainstream smoke components. Depending on the components that are targeted for reduction, the included adsorbent/absorbents may be chemically treated or co-impregnated with certain chemical reagents which possess high reactivity and selectivity for those components. The size of the adsorbent/absorbent particles used can be designed to be much smaller than those known in the prior art so as to possess enhanced gas phase reaction kinetics. The preferred particle size used can be adjusted by the denier and the opening and volume of the cavities in the fiber. For a 3-dpf micro cavity fiber, the size of the particle entrapped may be in the range of 1–15 micrometers. A 6-dpf micro cavity fiber may hold larger particles than 1–15 micrometers. Significantly, the particles were entrapped in the internal volume of the fiber by being included within the volume of the said fiber. The included fine particles do not significantly increase the resistance to gas-flow exhibited by the fibers themselves, loaded or not. The TPM delivery of the cigarette can be controlled and optimized by controlling the packing density and geometry of the fibers, and will be largely independent of the extent to which such fibers are loaded with finely divided adsorbent/absorbent materials.

Other polymeric materials including, but not limited to, polyester and polysulfone may also be used for the micro cavity fibers for use in this invention. Other fiber materials may be used so long as they are compatible with cigarette use.

The micro-cavities as described here do not have to be as continuous. The impregnated fibers may be included in any part of the cigarette or an accessory smoking device in any possible engineering design that allow the them to be exposed to the smoke stream to reach the effect defined in this patent.

All the references discussed above are incorporated by reference in their entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

We claim:

1. A cigarette comprising
    a tobacco rod and
    a filter joined to said tobacco rod, said filter having a plug/space/plug configuration comprising
        a downstream plug.
        a space loaded with fiber containing semi-opened micro-cavities said cavities being loaded with adsorbent/absorbent particles or liquids and
        an upstream plug.
2. The cigarette as claimed in claim 1, wherein said fiber is loaded with an amorphous silica gel and with coconut carbon fiber.
3. A cigarette comprising
    a tobacco rod and
    a filter joined to said tobacco rod, said filter comprising a plug/space configuration comprising
        a downstream plug,
        a space loaded with fiber containing semi-opened micro-cavities said cavities being loaded with adsorbent/absorbent particles or liquids and
        an upstream plug.
4. The cigarette as claimed in claim 3, wherein said fiber is a trilobal fiber.
5. The cigarette as claimed in claim 4, wherein said fiber is loaded with carbon.
6. The cigarette as claimed in claim 5, wherein said fiber is loaded with an amorphous silica gel and with coconut carbon fiber.
7. The cigarette as claimed in claim 4, wherein said fiber is loaded with an amorphous silica gel.
8. The cigarette as claimed in claim 7, wherein said fiber is impregnated with coconut carbon fiber having a loading factor of about 50%.
9. The cigarette as claimed in claim 3, wherein said fiber is a quadrilobal fiber.
10. The cigarette as claimed in claim 9, wherein said fiber is loaded with carbon.
11. The cigarette as claimed in claim 9, wherein said fiber is loaded with an amorphous silica gel.
12. The cigarette as claimed in claim 11, wherein said carbon to fiber ratio is about 20–80% by weight.
13. The cigarette as claimed in claim 11, wherein said carbon to fiber ratio is about 20–80% by weight.
14. The cigarette as claimed in claim 3, wherein said absorbent/adsorbent particles are in a ratio to fiber in an amount from about 1% to about 150% by weight.
15. The cigarette as claimed in claim 3, wherein said absorbent/adsorbent particles are in a ratio to fiber in an amount from about 1% to about 150% by weight.
16. The cigarette as claimed in claim 3, wherein the fiber has about a 3 denier per filament micro-cavity and said particles entrapped have a size of about 1 to 15 micrometers.
17. The cigarette as claimed in claim 3, wherein said filter contains no binders or plasticizers or substantially no binders or plasticizers.
18. The cigarette as claimed in claim 3, wherein said fiber is loaded with an amorphous silica gel and with coconut carbon fiber.
19. A cigarette comprising
    a tobacco rod and
    a filter joined to said tobacco rod said filter comprising a plug/space configuration comprising
        a downstream plug,
        a space loaded with fiber containing opened micro-cavities said cavities being loaded with adsorbent/absorbent particles or liquids and
        an upstream plug.
20. The cigarette as claimed in claim 19, said fiber is a trilobal fiber.
21. The cigarette as claimed in claim 20, wherein said fiber is loaded wit carbon.
22. The cigarette as claimed in claim 20, wherein said fiber is loaded with an amorphous silica gel.
23. The cigarette as claimed in claim 19, wherein said fiber is a quadrilobal fiber.
24. The cigarette as claimed in claim 23, wherein said fiber is loaded with carbon.
25. The cigarette as claimed in claim 23, wherein said fiber is loaded with an amorphous silica gel.
26. The cigarette as claimed in claim 19, wherein the fiber has about a 3 denier per filament micro-cavity and said particles entrapped have a size of about 1 to 15 micrometers.
27. The cigarette as claimed in claim 19, wherein said filter contains no binders or plasticizers or substantially no binders or plasticizers.
28. The cigarette as claimed in claim 19, wherein said fiber is loaded with an amorphous silica gel and with coconut carbon fiber.

* * * * *

UNITED STATES PATENT AND TRADEMARK OFFICE
CERTIFICATE OF CORRECTION

PATENT NO.     : 6,584,979 B2                                                Page 1 of 1
DATED          : July 1, 2003
INVENTOR(S)    : Lixin L. Xue et al.

It is certified that error appears in the above-identified patent and that said Letters Patent is hereby corrected as shown below:

<u>Column 24,</u>
Line 43, "wit" should read -- with --.

Signed and Sealed this

Ninth Day of September, 2003

JAMES E. ROGAN
*Director of the United States Patent and Trademark Office*